(12) United States Patent
Hanneken et al.

(10) Patent No.: US 12,320,690 B2
(45) Date of Patent: Jun. 3, 2025

(54) POWDER DISPENSER

(71) Applicant: Dr. Brown's Company, St. Louis, MO (US)

(72) Inventors: Douglas Hanneken, St. Louis, MO (US); Bernard J. Kemper, Bonne Terre, MO (US)

(73) Assignee: Dr. Brown's Company, St. Louis, MO (US)

( * ) Notice: Subject to any disclaimer, the term of this patent is extended or adjusted under 35 U.S.C. 154(b) by 134 days.

(21) Appl. No.: 18/326,719

(22) Filed: May 31, 2023

(65) Prior Publication Data

US 2023/0392967 A1    Dec. 7, 2023

Related U.S. Application Data

(60) Provisional application No. 63/347,775, filed on Jun. 1, 2022.

(51) Int. Cl.
*G01F 11/46*    (2006.01)

(52) U.S. Cl.
CPC .................... *G01F 11/46* (2013.01)

(58) Field of Classification Search
CPC ................ G01F 11/42; G01F 11/46
See application file for complete search history.

(56) References Cited

U.S. PATENT DOCUMENTS

| | | | |
|---|---|---|---|
| 3,069,999 A | 12/1962 | Morrisoa | |
| 5,209,607 A * | 5/1993 | Wei ........................ | B01J 8/003 |
| | | | 422/219 |
| 5,934,573 A * | 8/1999 | Weterrings ............ | G01F 11/24 |
| | | | 222/452 |
| 8,584,901 B2 | 11/2013 | Dooley et al. | |
| 2016/0157670 A1 | 6/2016 | Niron et al. | |
| 2016/0174751 A1 | 6/2016 | Fusco et al. | |
| 2019/0055079 A1 | 2/2019 | Nagami et al. | |

(Continued)

FOREIGN PATENT DOCUMENTS

| CN | 204210934 U | 3/2015 |
|---|---|---|
| CN | 108968690 A | 12/2018 |

OTHER PUBLICATIONS

"Formula Pro Advanced Baby Formula Dispenser", Baby Brezza Product Webpage, archived on May 11, 2022 at URL: https://web.archive.org/web/20220511082703/https://babybrezza.com/products/formula-pro-advanced.

(Continued)

*Primary Examiner* — Timothy L Maust
(74) *Attorney, Agent, or Firm* — Armstrong Teasdale LLP

(57) ABSTRACT

A powder dispenser generally includes a reservoir adapted to contain a powder, a rotor disposed within the reservoir, a plate, and an engagement member. The rotor is configured to rotate about an axis and engage the powder within the reservoir. The plate is positioned below the rotor and defines a slot configured to receive the powder as the rotor rotates about the axis. The plate is arranged to rotate relative about the axis. The engagement member is aligned with at least one opening and is configured to extend into the slot defined in the plate. The engagement member is configured to direct a volume of the powder from the slot into the at least one opening as the plate rotates. The volume of the powder is dispensed through the opening as the plate rotates.

17 Claims, 28 Drawing Sheets

(56) References Cited

U.S. PATENT DOCUMENTS

2019/0239678 A1 8/2019 Cao et al.

OTHER PUBLICATIONS

Babylist, "Baby Brezza Formula Pro Advanced Review—Babylist", YouTube Video, uploaded on Sep. 12, 2019 accessed online at URL: https://www.youtube.com/watch?v=2oglynyce-c.
Invitation to Pay Additional Fees and, Where Applicable, Protest Fee issued in International Patent Application No. PCT/US2023/067648, mailed Sep. 1, 2023, 3 pages.
International Search Report and Written Opinion for Patent Application No. PCT/US2023/067648 dated Nov. 2, 2023; 12 pp.

\* cited by examiner

POWDER DISPENSER

CROSS REFERENCE TO RELATED APPLICATION

This application claims the benefit of U.S. Provisional Patent Application No. 63/347,775 filed Jun. 1, 2022, which is hereby incorporated by reference in its entirety.

BACKGROUND

The field of this disclosure relates generally to powder dispensers and more particularly to a powder dispenser including a metering assembly configured to dispense precise amounts of powder.

Powder dispensers are useful for preparing infant formula, drinks, food, or other powder-based mixtures. Powder dispensers typically include a metering assembly that dispenses a measured quantity of powder from a reservoir. For example, some powder dispensers include a plurality of discrete measuring compartments that are selectively positioned relative to the reservoir to dispense a measured quantity of powder from the reservoir. During or after dispensing, the dispensed powder may be mixed with a liquid such as water. Accordingly, the powder dispensers are useful for preparing mixtures requiring a predetermined volume of powder and liquid.

However, at least some powder dispensers can only dispense volumes of powder according to the volume of the measured compartments. In addition, the powder may become clogged or clumped within the powder dispenser and the powder dispensers may dispense inaccurate volumes of powder. As a result, the volume of powder dispensed by the powder dispensers may not be correct for recipe requirements. For example, the powder dispenser may dispense a lesser or greater amount of powder for infant formula than is prescribed by the formula recipe, resulting in an infant being under- or over-nourished.

Therefore, there is a need for a powder dispenser that dispenses a precise volume of powder and that can provide variable volumes of powder according to a mixture recipe.

SUMMARY

In one aspect, a powder dispenser generally comprises a reservoir adapted to contain a powder, a rotor disposed within the reservoir, a first plate, a second plate, and an engagement member. The rotor is configured to rotate about an axis and engage the powder within the reservoir. The first plate is positioned below the rotor and defines a slot configured to receive the powder as the rotor rotates about the axis. The second plate is positioned below the first plate and defines at least one opening aligned with a portion of the slot. The first plate or the second plate is arranged to rotate relative to the other of the first plate or the second plate. The engagement member is aligned with the opening on the second plate and is configured to extend into the slot defined in the first plate. The engagement member is configured to direct a volume of the powder from the slot into the at least one opening in the second plate as the first plate or the second plate rotates. The volume of the powder is dispensed through the opening as the first plate or the second plate rotates.

In another aspect, a metering assembly for a powder dispenser generally comprises a first plate, a second plate, and an engagement member. The first plate is sized to fit within a reservoir. The first plate has a slot extending around an axis, and is configured to rotate about the axis and receive powder within the slot. The second plate is positioned below the first plate and defines at least one opening aligned with a portion of the slot. The engagement member is aligned with the opening on the second plate and is configured to extend from the second plate into the slot defined in the first plate. The engagement member is configured to direct a volume of the powder from the slot into the at least one opening as the first plate rotates. The slot extends continuously around the axis to provide a continuous unobstructed path for the engagement member as the first plate rotates. The volume of the powder is dispensed through the opening as the first plate rotates.

In yet another aspect, a metering assembly for a powder dispenser generally comprises a plate and an engagement member. The plate is configured to rotate about an axis and includes an inner member that is a circle and has a circumference, an outer member that is annular and extends circumferentially around the inner member, and a slot extending between the inner member and the outer member. The slot is arranged to receive powder and induce the powder to rotate with the plate. The plate also includes bridges extending across the slot and connecting the inner member to the outer member. The engagement member is configured to extend into the slot defined in the plate. The engagement member is configured to direct a volume of powder from the slot into an opening as the plate rotates. The slot extends continuously around the axis to provide a continuous unobstructed path for the engagement member as the plate rotates.

In yet another aspect, a powder dispenser generally comprises a reservoir adapted to contain a powder and a plate positioned within the reservoir. The reservoir defines at least one opening. The plate is configured to rotate about an axis between a first position and a second position to selectively cover the opening. The plate includes a key extending from the plate. The key engages the reservoir to limit rotation of the plate between the first position and the second position.

DETAILED DESCRIPTION OF THE DRAWINGS

Figure 1:
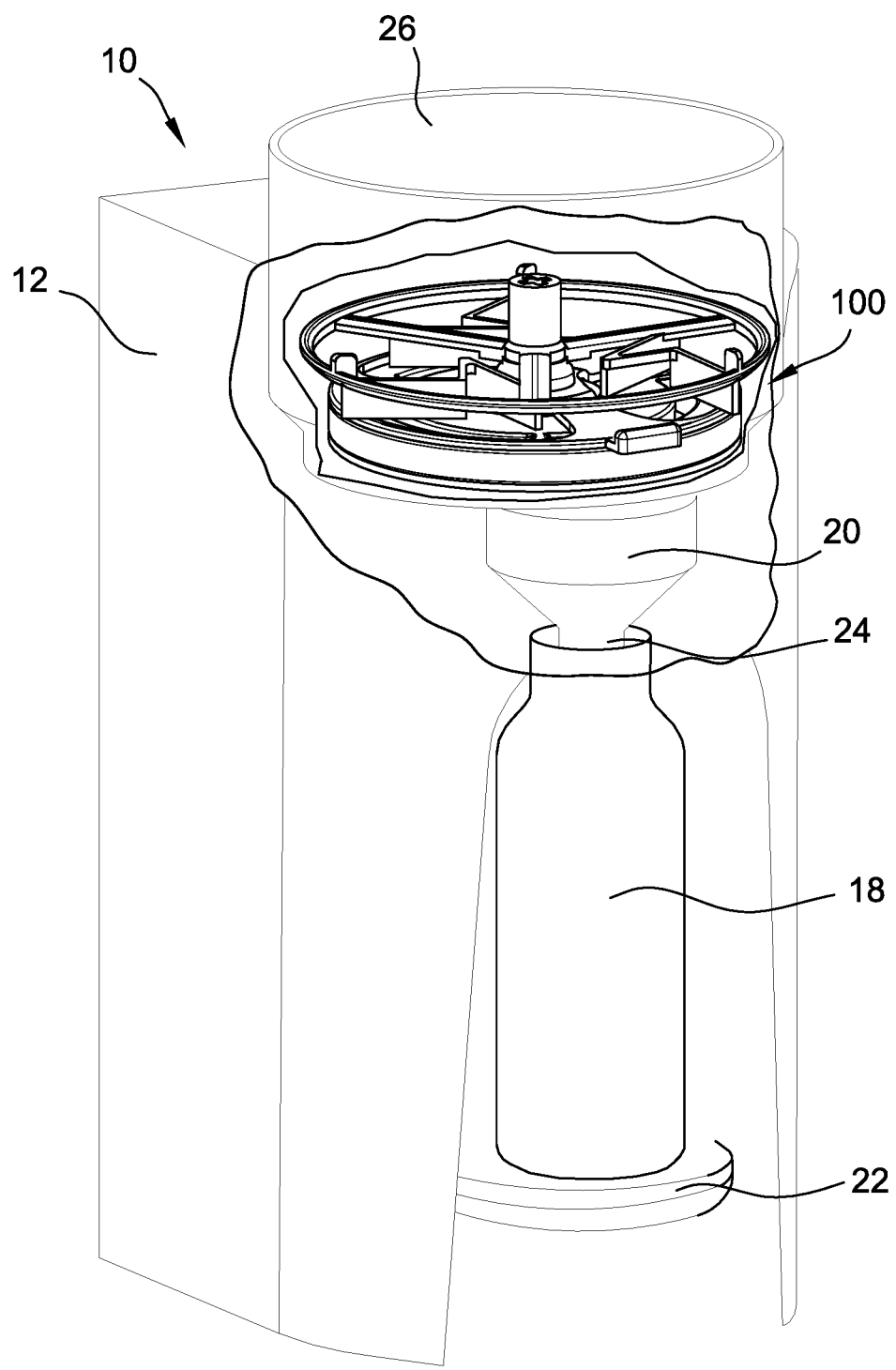
FIG. 1 is a perspective view of one suitable embodiment of a powder dispenser, the powder dispenser having a metering assembly and being configured to dispense powder or powder and liquid into a bottle.

With reference now to the accompanying drawings, and specifically to FIG. 1, a powder dispenser according to one suitable embodiment of the present disclosure is illustrated and is indicated generally at 10. The powder dispenser 10 may be used to dispenser powder and prepare infant formula, drinks, food, or other powder-based mixtures. As used herein, the term "powder" refers to a material comprised of a plurality of solid particles.

The powder dispenser 10 includes a metering assembly indicated generally at 100 that is configured to dispense precise volumes of powder and is able to vary the volume of dispensed powder according to different recipes for powder-based mixtures. For example, the powder dispenser 10 is configured to dispense powder 16 (shown in FIG. 7) into a container such as a bottle 18. The powder 16 may be mixed with a liquid such as water to form a mixture. For example, the powder dispenser 10 includes a funnel 20 that receives the powder and the liquid and acts as a mixing compartment. The liquid may be dispensed into the funnel 20 from a liquid outlet connected to a liquid supply (not shown). Alternatively, the powder may be dispensed by the powder dispenser 10 through the funnel 20 and into the bottle 18 in a "dry" state, i.e., without liquid. The funnel 20 includes an outlet 24 for the powder or mixture to exit the funnel and be dispensed into the bottle 18.

Figure 2:
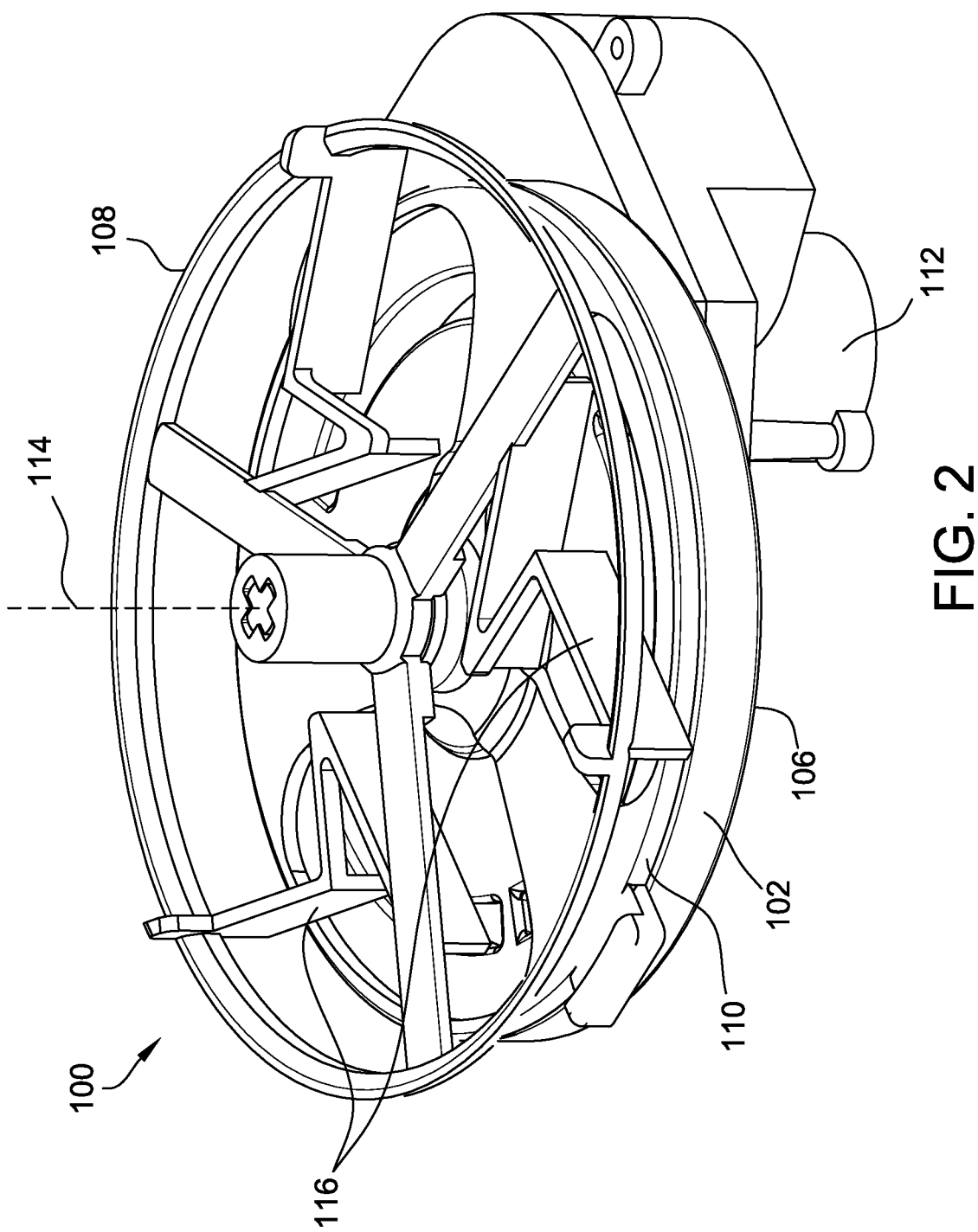
FIG. 2 is a perspective view of the metering assembly of the powder dispenser.
Figure 3:
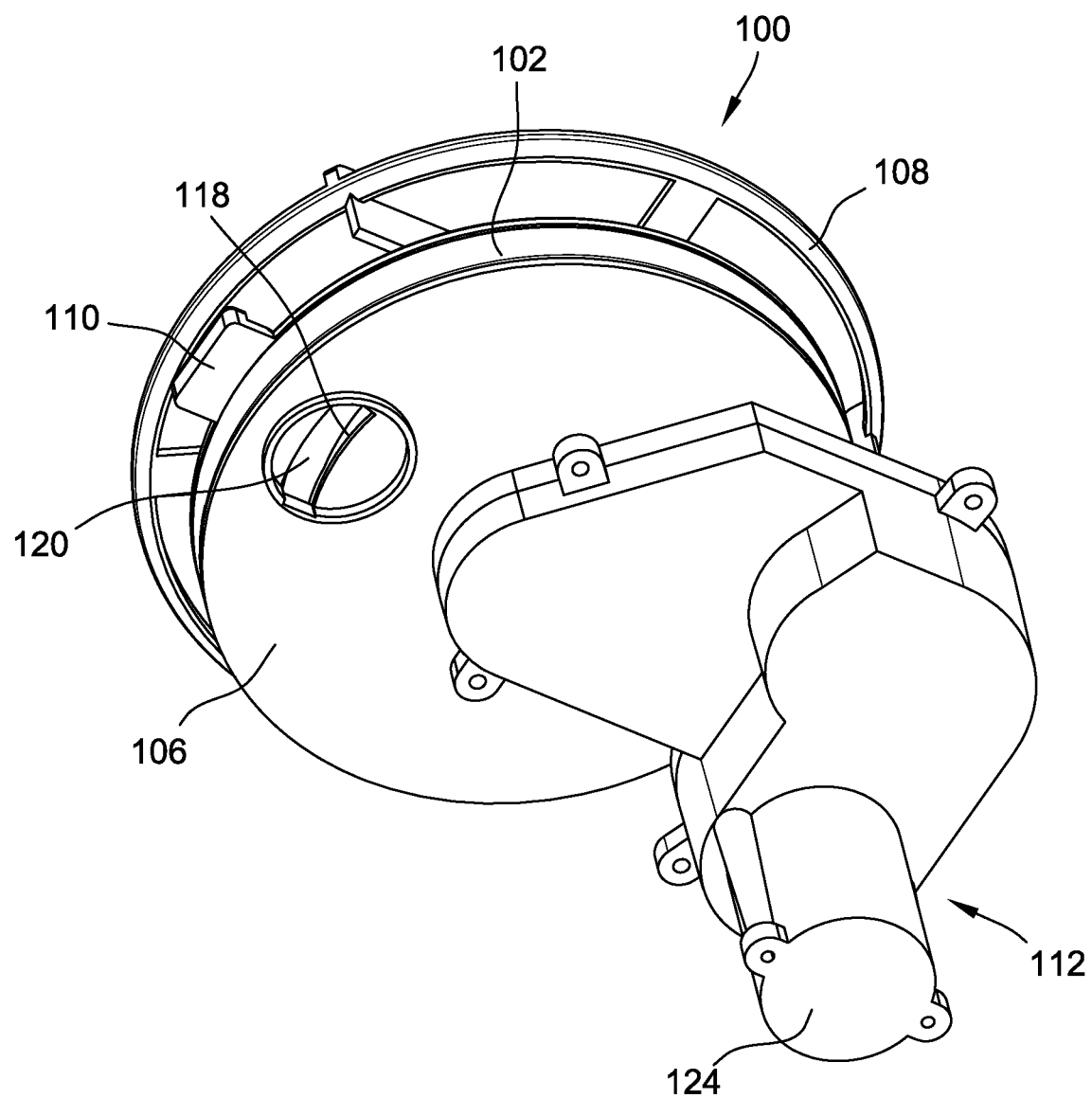
FIG. 3 is another perspective view of the metering assembly, illustrating an underside of the metering assembly with an opening for dispensing a measured volume of powder.

As seen in FIG. 1, the powder dispenser 10 includes a suitable housing, indicated generally at 12, for housing various working components such as a motor assembly 112 (shown in FIG. 2). In suitable embodiments, the powder dispenser 10 includes a user interface configured to display messages and receive inputs from a user. For example, the user interface may be used to receive user inputs relating to amounts of powder to be dispensed or instructions relating to a mixture recipe. The user interface may be incorporated with the housing 12 and/or may be located at least in part on a remote device such as a computing device.

In addition, the powder dispenser 10 includes a reservoir 26 mounted on the housing 12 and adapted to contain a powder, and a stand 22 configured to support the bottle 18 while the powder dispenser 10 dispenses the powder or a mixture through the outlet 24 of the funnel 20 and into the bottle 18. The reservoir 26 may have any suitable size and shape. Suitably, the reservoir 26 is a cylinder and has a diameter and a height. In suitable embodiments, the diameter of the reservoir 26 is greater than the height of the reservoir. The arrangement of the reservoir 26 facilitates the metering assembly 100 receiving and dispensing the powder.

The metering assembly 100 dispenses the powder from the reservoir and into the funnel 20 where the powder may be mixed with a liquid. The powder or a mixture is dispensed through the outlet 24 of the funnel 20 and into the bottle 18. The reservoir 26 is disposed above the funnel 20 and the stand 22 such that powder can flow from the reservoir 26, through the funnel 20, and into the bottle 18 positioned on the stand 22 at least partly due to the force of gravity.

As seen in FIGS. 1-5, the metering assembly 100 includes a first plate 102 having a slot 104, a second plate 106, a rotor 108, a guide 110, and the motor assembly 112. The first plate 102, the second plate 106, the rotor 108, and the guide 110 of the metering assembly 100 are disposed within the reservoir 26. In suitable embodiments, one or more components of the metering assembly 100 may be incorporated into the reservoir 26 or the housing 12. For example, in suitable embodiments, the second plate 106 may be incorporated into a bottom of the reservoir 26.

The rotor 108 is configured to rotate generally about an axis 114 (FIG. 4) and engage the powder within the reservoir 26. For example, the rotor 108 includes blades 116 that are shaped to engage and direct the powder towards the guide 110 and the first plate 102 as the rotor rotates within the reservoir 26. The first plate 102 is positioned below the rotor 108 and the guide 110 and is arranged to rotate with the rotor 108 generally about the axis 114. The slot 104 is arranged to receive powder as the rotor 108 and the first plate 102 rotate generally about the axis 114. The guide 110 is disposed between the first plate 102 and the rotor 108 and is fixed in position (i.e., does not rotate) as the rotor 108 and the first plate 102 rotate. The guide 110 collects the powder and directs the powder into the slot 104 in the first plate 102 as the rotor 108 and the first plate rotate.

The second plate 106 is positioned below the first plate 102 and has at least one opening 118 aligned with a portion of the slot 104. The second plate 106 also includes an engagement member 120 aligned with the opening 118 and configured to extend into the slot 104 defined in the first plate 102. The engagement member 120 is configured to direct a predetermined volume of the powder from the slot 104 through the at least one opening 118 in the second plate 106 as the first plate 102 rotates.

The motor assembly 112 includes a motor 124 and a drive shaft 126. The drive shaft 126 extends along the axis 114 and through bores 139, 144, 149, 157 of components within the reservoir. The drive shaft 126 is drivingly coupled to the first plate 102 and the rotor 108. For example, the bores 139, 149 in the first plate 102 and the rotor 108 have a shape that corresponds to a shape of the drive shaft 126 and are configured to engage the drive shaft. The bores 144, 157 of the components within the reservoir 26 are sized to facilitate the drive shaft 126 rotating relative to the reservoir 26, the second plate 106, and the guide 110 without interference between the drive shaft 126 and the components. The motor assembly 112 may include transmission components, shafts, and/or gears extending between and drivingly connecting the drive shaft 126 and the motor 124.

As seen in FIGS. 2-7, during operation, the reservoir 26 (FIGS. 1 and 7) is filled with a powder. The motor assembly 112 induces rotation of the rotor 108 and the first plate 102 within the reservoir 26 to mix and distribute the powder 16 within the reservoir. During operation, the motor 124 is configured to induce rotation of the rotor 108 and the first plate 102 at the same speed via the drive shaft 126. In alternative embodiments, the rotor 108 and the first plate 102 may rotate at different speeds and/or in different directions without departing from aspects of the disclosure. In suitable embodiments, the second plate 106 may be arranged to rotate relative to or with the first plate 102.

The blades 116 on the rotor 108 contact the powder as the rotor 108 rotates within the reservoir 26 to prevent clumping of the powder 16 and facilitate the powder 16 having a proper consistency and fluidity. In addition, the rotor 108 directs the powder towards the guide 110. The guide 110 is fixed in position (i.e., does not rotate) and is configured to contact and retain portions of the powder above the first plate 102 and the slot 104 as the first plate 102 rotates. The powder 16 that is collected above the slot 104 fills the slot 104 and replaces powder 16 that is dispensed through the opening 118. The opening 118 is sized to facilitate powder 16 flowing through the opening 118. For example, the opening 118 is wider than the engagement member 120 and the engagement member 120 regulates the volume of powder 16 that flows through the opening 118.

The engagement member 120 extends into the slot 104 and travels along a path through the slot 104 as the first plate 102 rotates relative to the second plate 106. The slot 104 extends continuously around the axis 114 to provide a continuous unobstructed path for the engagement member 120 as the first plate 102 rotates. Suitably, the slot 104 is sized to frictionally engage the powder 16 and cause the powder 16 to rotate with the first plate 102 when the first plate 102 rotates. The engagement member 120 contacts the powder 16 in the slot 104 and directs a predetermined volume of the powder 16 from the slot 104 into the opening 118 as the first plate 102 rotates. The predetermined volume of powder 16 is dispensed through the opening 118 and into the funnel 20 where the powder 16 may be mixed with a liquid. Suitably, the metering assembly 100 of the powder dispenser 10 dispenses the volume of powder 16 based on user inputs and/or a preset recipe. For example, the powder dispenser 10 provides a volume of liquid that corresponds to a volume of powder 16 selected by a user via the user interface. The powder 16 or a mixture is dispensed through the outlet 24 of the funnel 20 into the bottle 18 (shown in FIG. 1).

The volume of powder 16 dispensed by the metering assembly 100 can be selectively varied to provide different volumes of powder 16 and prepare a broader range of mixtures than other powder dispensers. For example, the powder dispenser 10 has adjustability to a more exact amount than other powder dispensers and is not limited to large incremental adjustments because the metering assembly 100 does not rely on premeasured compartments. In particular, the slot 104 and the engagement member 120 facilitate infinite adjustments of the volume of powder 16 by adjusting the rotation of the first plate 102. For example, the volume of powder 16 is adjusted by changing the number of rotations and/or varying the angle of rotation of the first plate 102.

Figure 8:
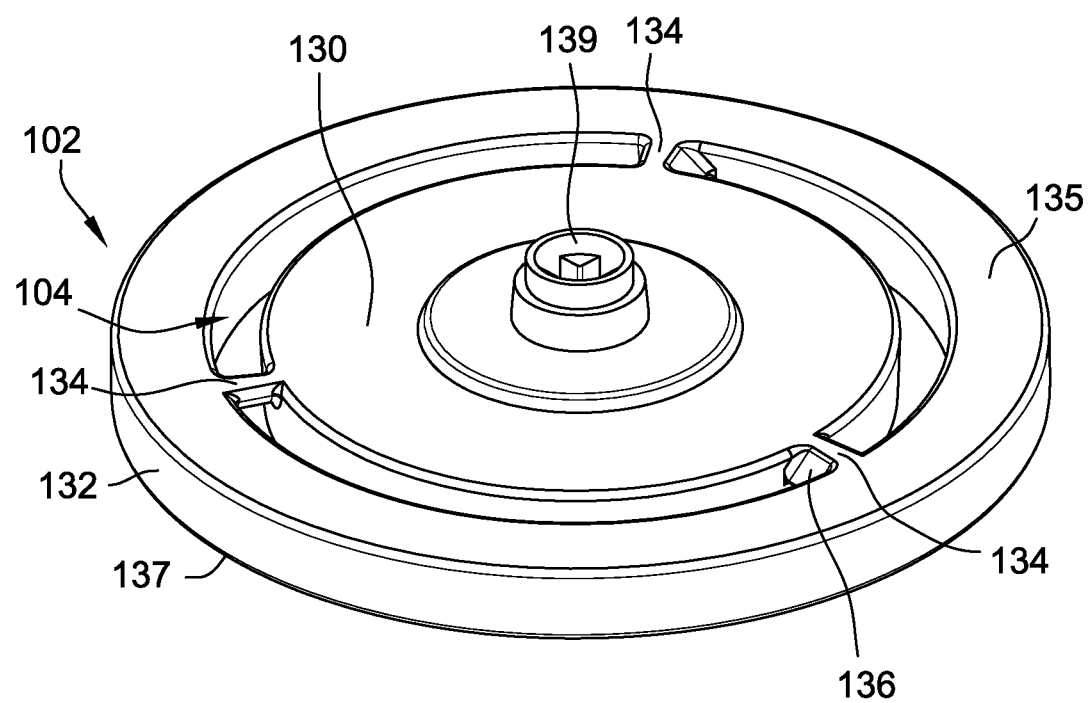
FIG. 8 is a perspective view of the first plate of the metering assembly.
Figure 9:
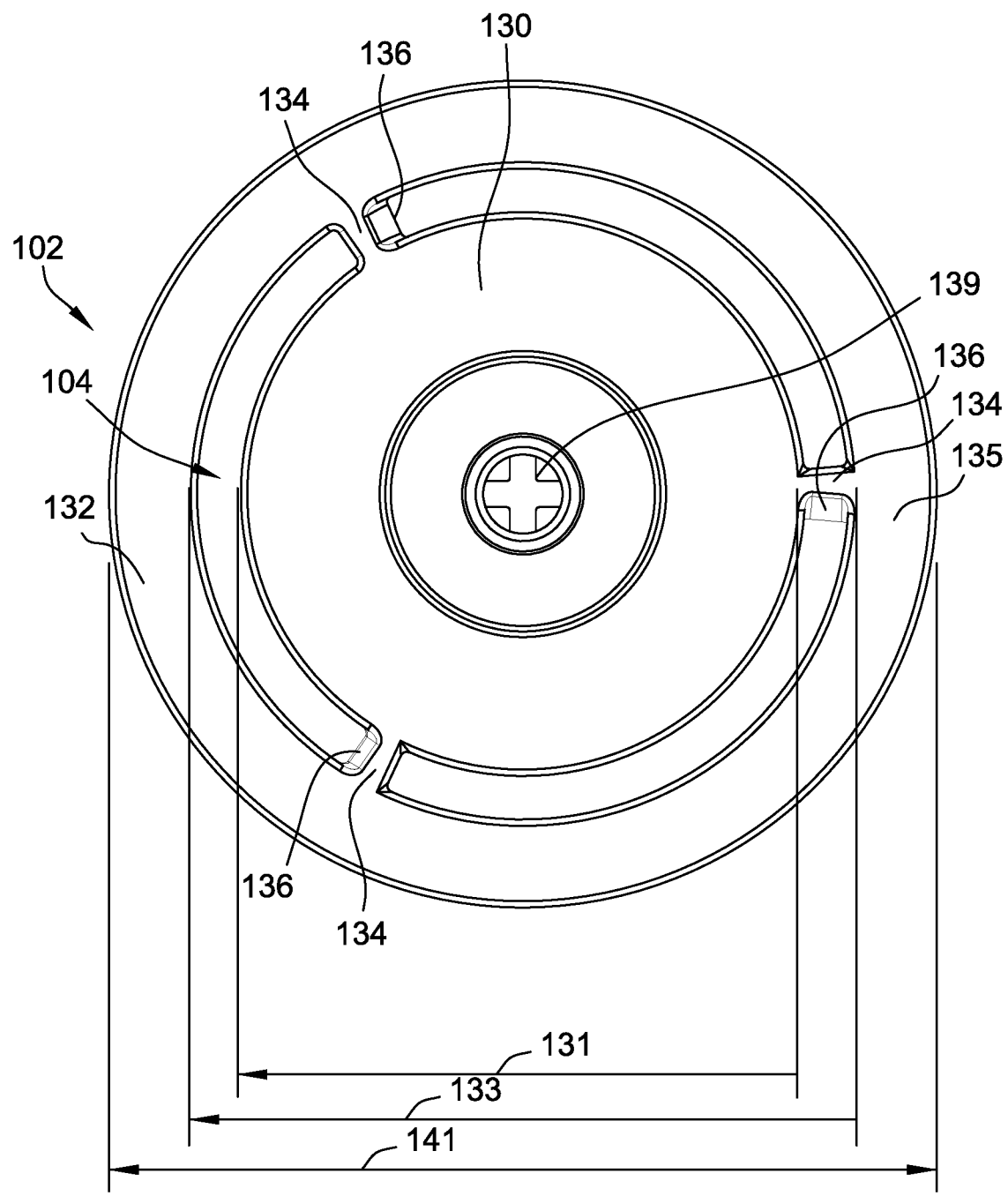
FIG. 9 is a top view of the first plate.
Figure 10:
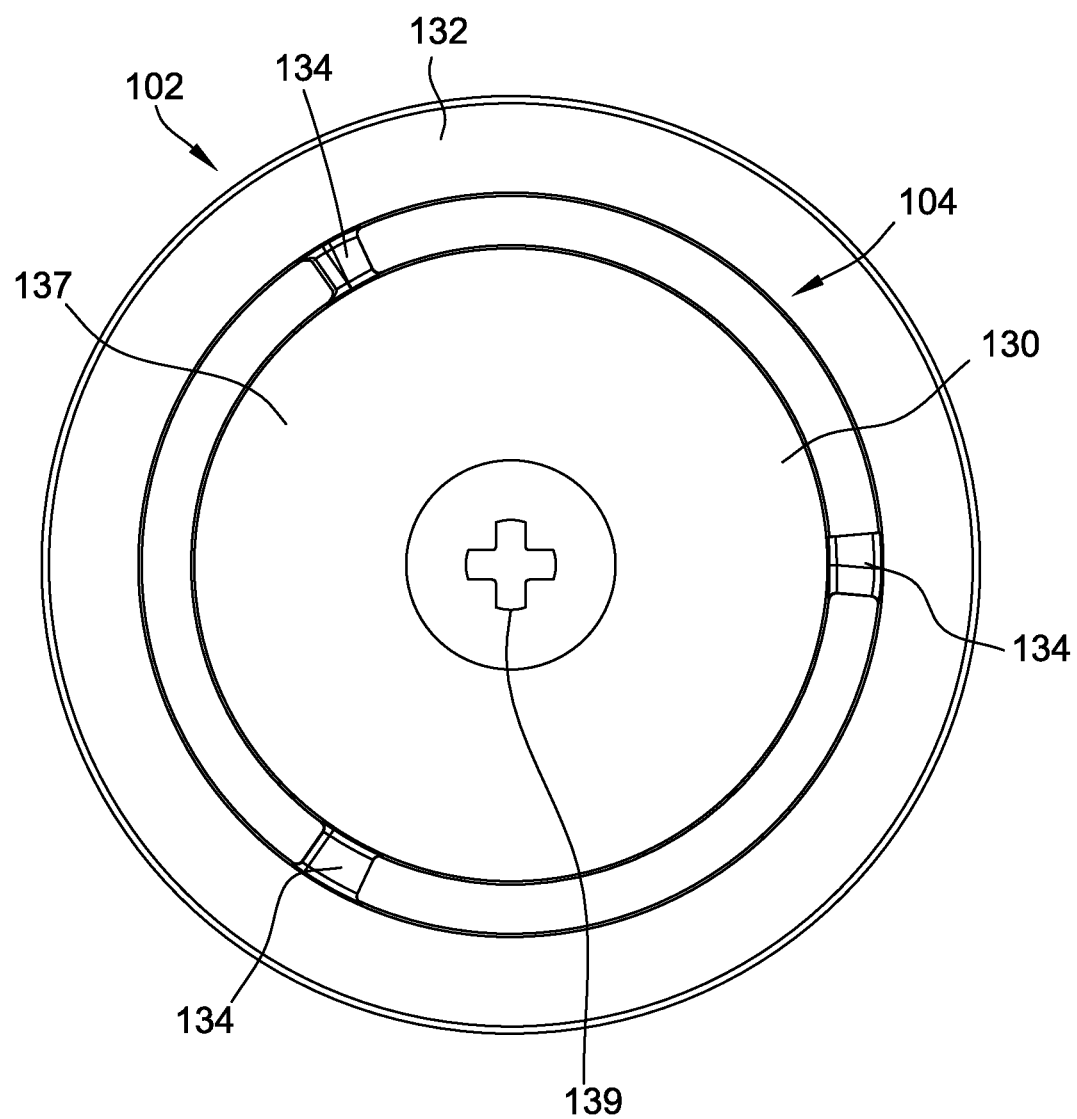
FIG. 10 is a bottom view of the first plate.
Figure 11:
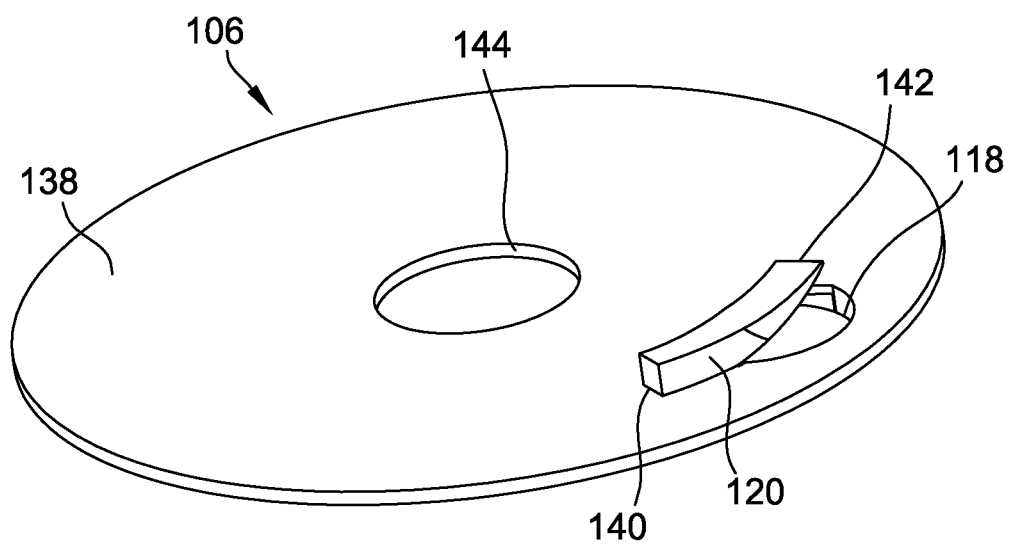
FIG. 11 is a perspective view of the second plate of the metering assembly.
Figure 12:
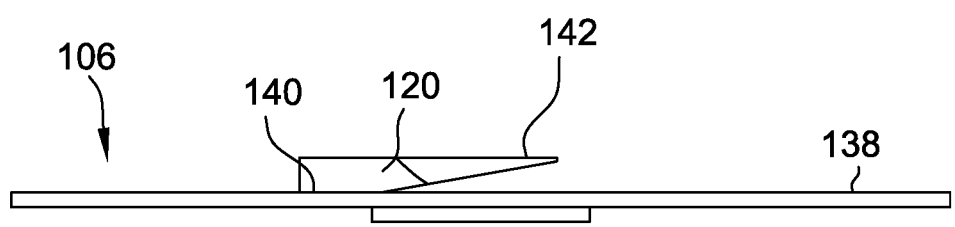
FIG. 12 is a side view of the second plate.
Figure 13:
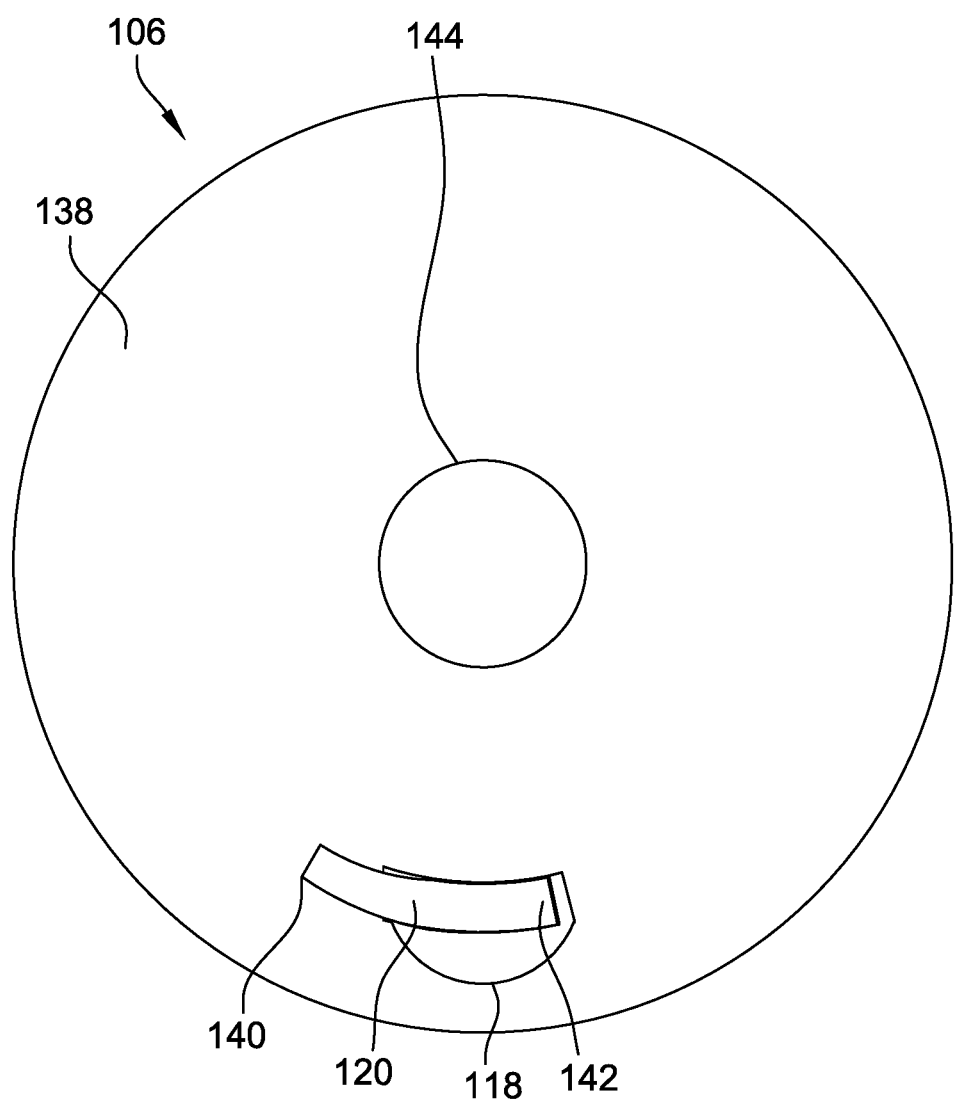
FIG. 13 is a top view of the second plate.
Figure 14:
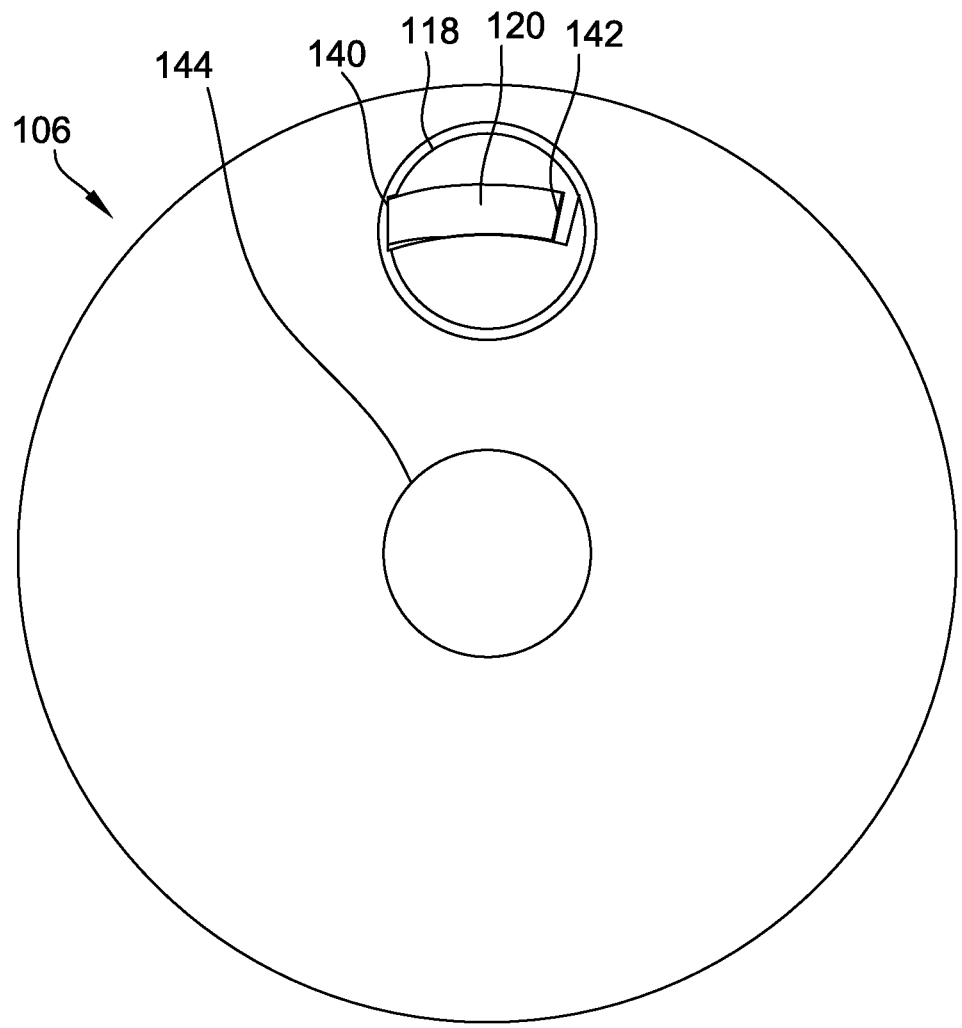
FIG. 14 is a bottom view of the second plate.

Referring to FIGS. 8-10, the first plate 102 includes an inner member 130, an outer member 132, and bridges 134 connecting the inner member 130 to the outer member 132. The first plate 102 includes an upper surface 135 and a lower surface 137 that are flat. The first plate 102 is shaped to fit within the reservoir 26 (shown in FIG. 1) and facilitate rotation of the first plate 102 within the reservoir 26. For example, the inner member 130 is a circle and has an outer diameter 131 and a circumference. The outer member 132 is an annular ring and has an inner diameter 133, an inner circumference, an outer diameter 141, and an outer circumference. The slot 104 is defined between the outer circumference of the inner member 130 and the inner circumference of the outer member 132.

Figure 4:
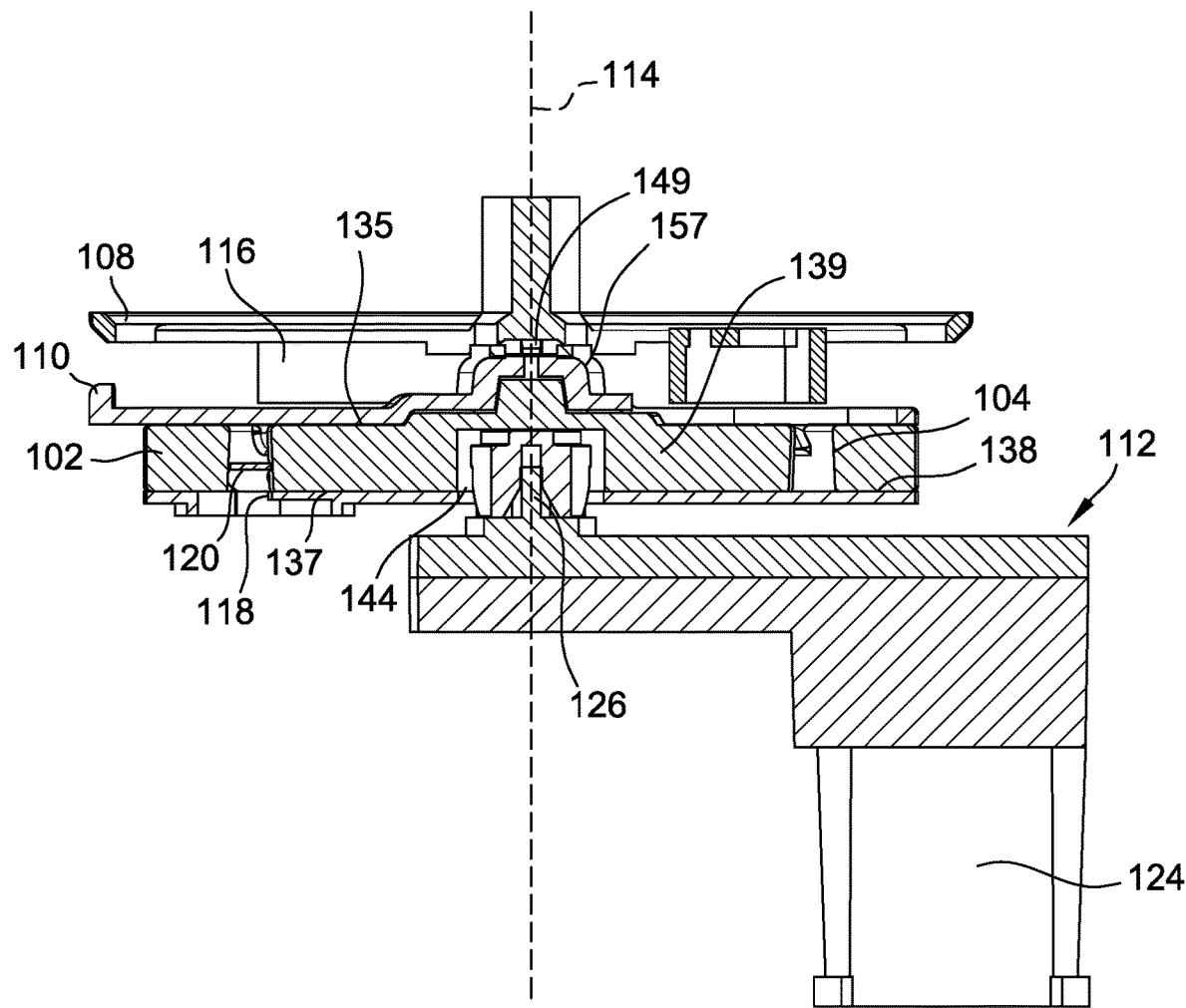
FIG. 4 is a sectional view of the metering assembly.
Figure 5:
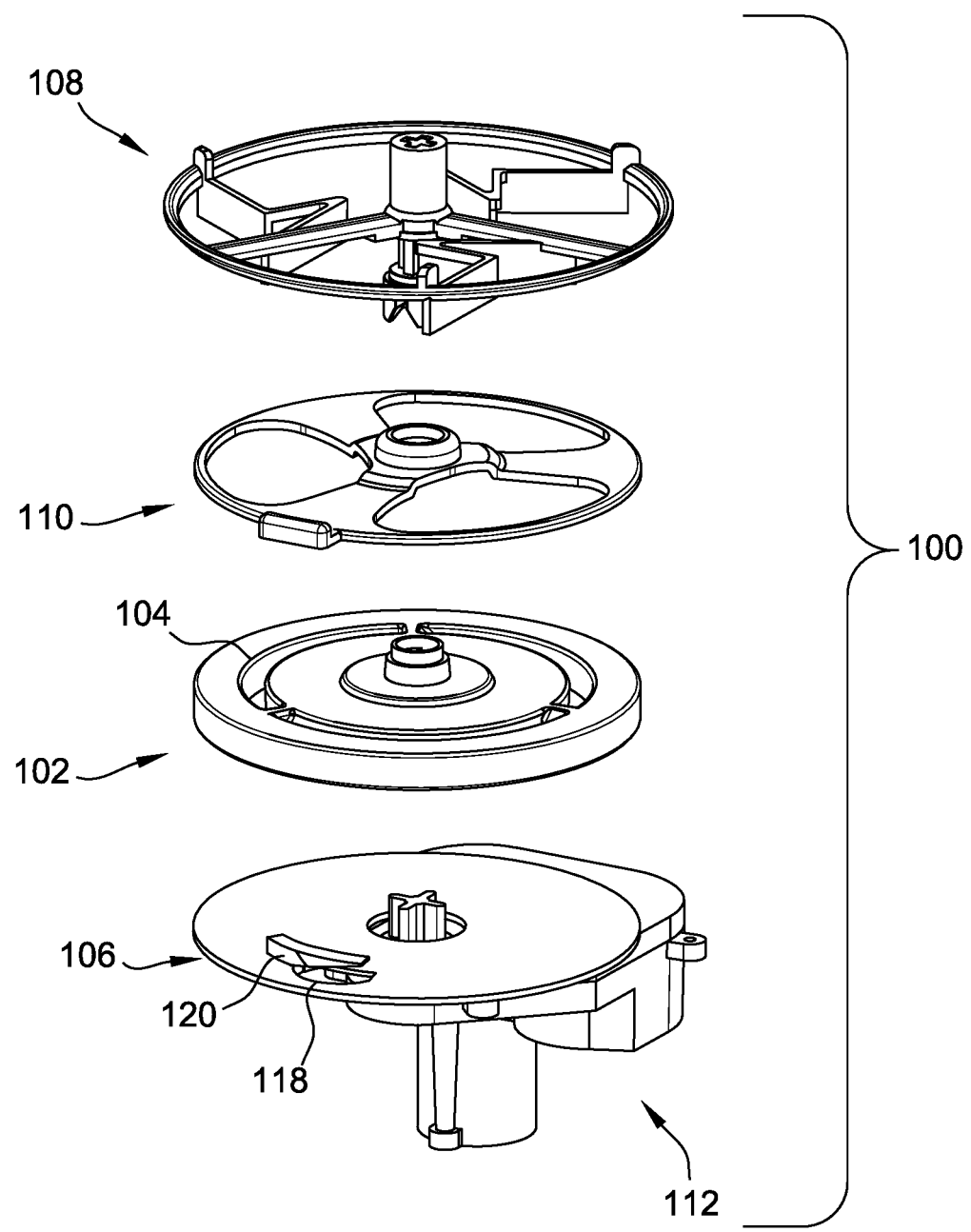
FIG. 5 is an exploded view of the metering assembly, the metering assembly including a first plate having a slot, a second plate, a rotor, a guide, and a motor assembly.
Figure 6:
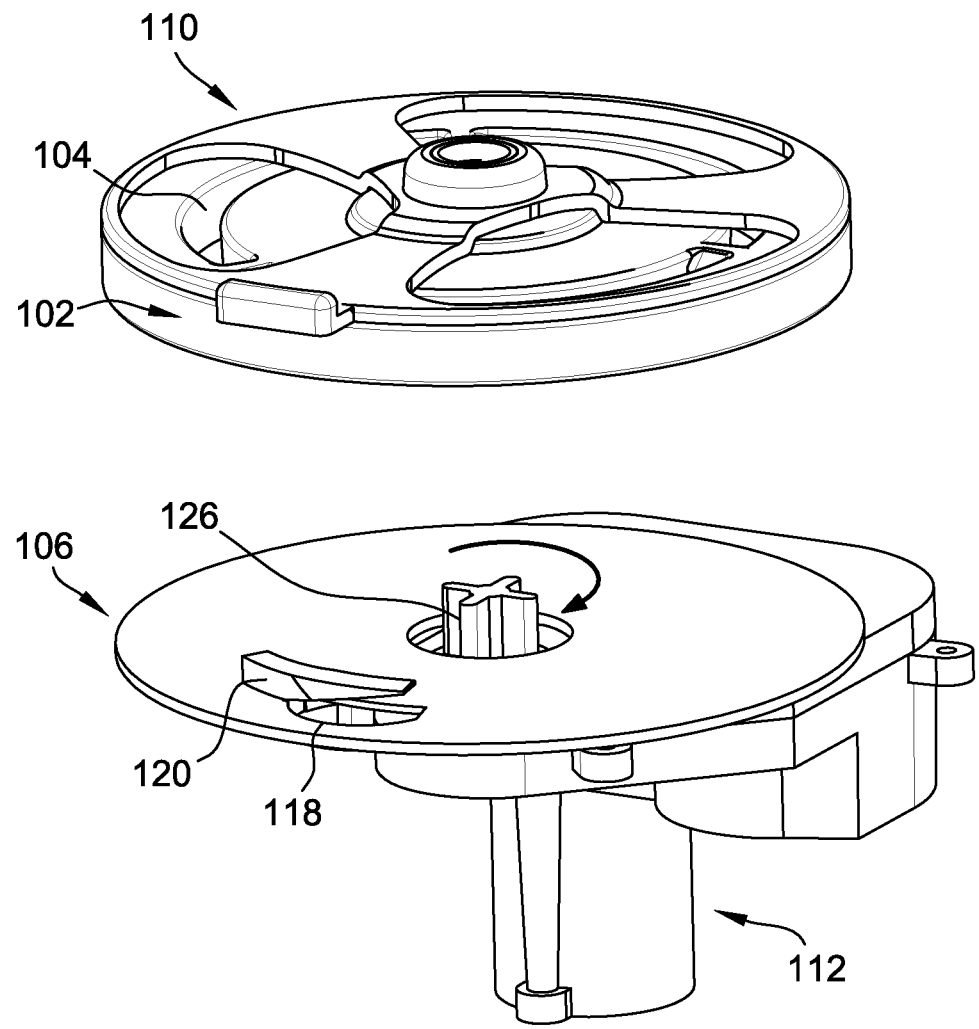
FIG. 6 is a perspective view of a portion of the metering assembly with the first plate and the guide disconnected from the second plate and the motor assembly, illustrating rotation of a drive shaft of the motor assembly.

The inner member 130 of the first plate 102 includes a bore 139 that is shaped to receive and engage the drive shaft 126 (shown in FIGS. 4-6). The drive shaft 126 engages the first plate 102 to cause the first plate 102 to rotate with the drive shaft 126 when the drive shaft 126 rotates generally about the axis 114. For example, the bore 139 has a cross shape which matches the shape of the drive shaft 126. The bore 139 is located at a center of the inner member 130.

As seen in FIGS. 8-10, the slot 104 extends continuously around the axis 114 and the circumference of the inner member 130. In addition, the slot 104 extends through the entire depth of the first plate 102. Accordingly, the slot 104 separates the inner member 130 and the outer member 132. The bridges 134 extend across the slot 104 to connect the inner member 130 and the outer member 132.

Suitably, the first plate 102 including the inner member 130, the outer member 132, and the bridges 134 are integrally formed as a single piece. For example, the first plate 102 may be constructed of a plastic material such a polypropylene. In suitable embodiments, the first plate 102 may be constructed of other materials without departing from some aspects of the disclosure.

Referring to FIGS. 7-10, the slot 104 is sized and shaped to receive and fill with powder that is collected by the guide 110 as the first plate 102 and the rotor 108 rotate and to facilitate the powder being dispensed through the opening 118. In addition, the slot 104 is sized and shaped to receive the engagement member 120 and to facilitate the engagement member 120 removing the predetermined amount of the powder from the slot 104 as the first plate 102 rotates. For example, the slot 104 has a width that is sized to fill with the powder and provide a frictional engagement of the powder within the slot. For example, the slot 104 has a width in range of 3 millimeters (mm) to 25 mm.

The bridges 134 are arranged to support the outer member 132 and the inner member 130 and facilitate powder flowing into the slot 104. For example, the bridges 134 extend across the width of the slot 104 to connect the inner member 130 to the outer member 132. Also, the bridges 134 are relatively narrow (i.e., each bridge has a length that is greater than its width) such that the bridges 134 do not obstruct the top of the slot 104 and the openings between bridges extend along substantially the entire top of the slot 104. Also, the bridges 134 act as abutments that facilitate movement of the powder within the slot 104 toward engagement member 120.

Figure 21:
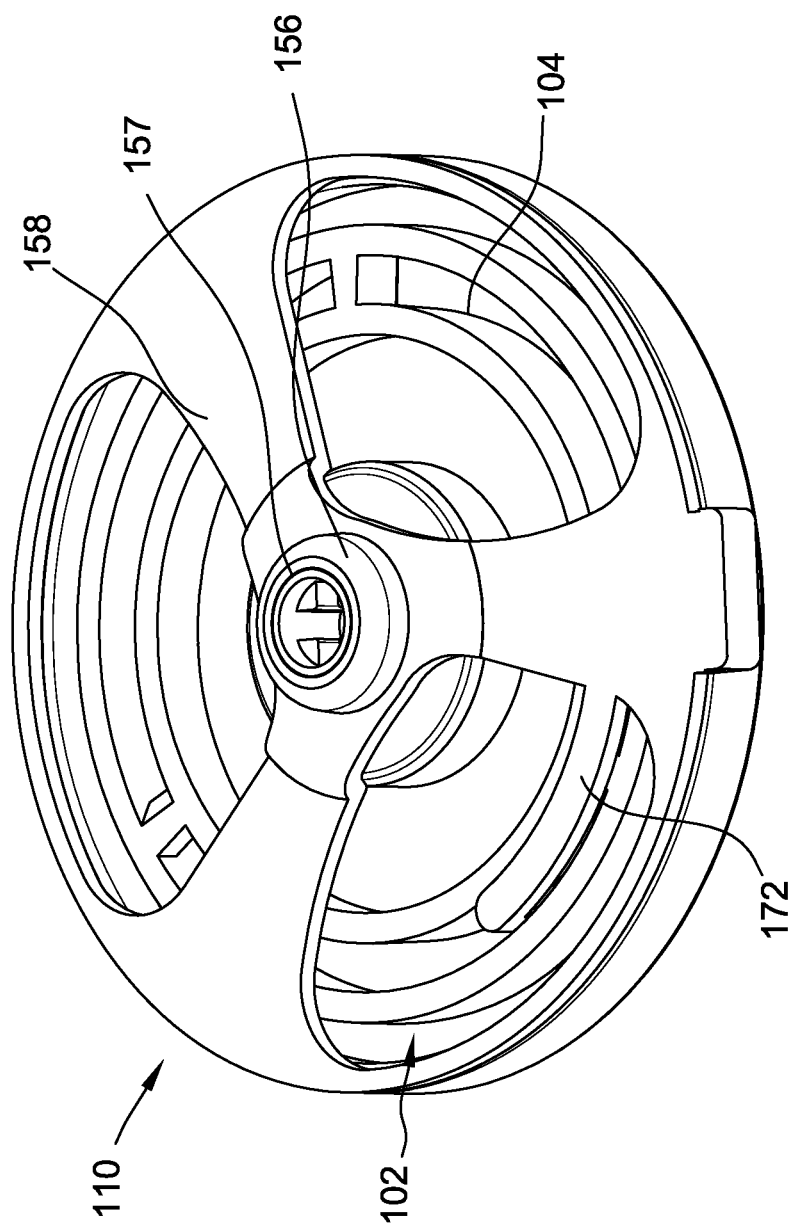
FIG. 21 is a perspective view of an embodiment of the plate and the guide of the metering assembly of FIG. 2.
Figure 22:
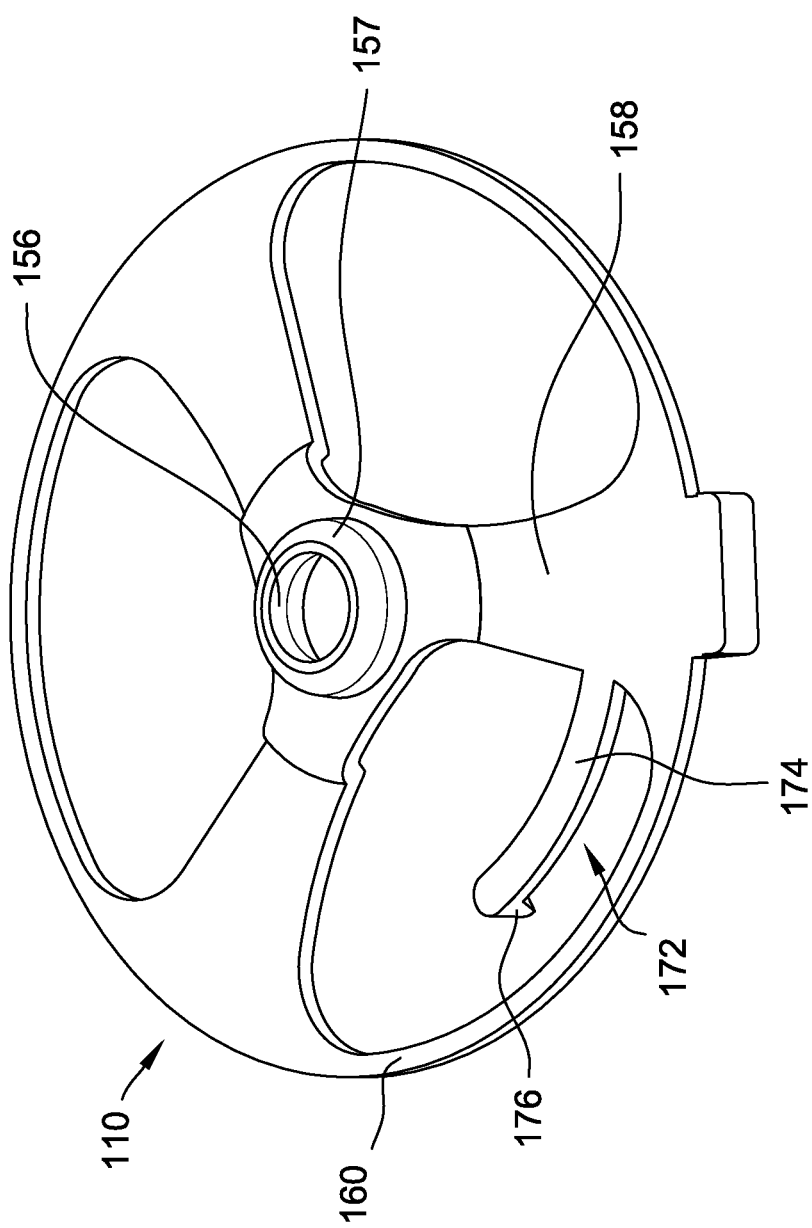
FIG. 22 is a perspective view of the guide of FIG. 21, the guide including a finger.

In addition, the bridges 134 may include ramps 136 that may engage an optional finger 172 on guide 110. For example, FIGS. 21 and 22 illustrate an embodiment of the guide 110 including the ramps 136 and the finger 172. The finger 172 extends down into the slot 104 to direct the powder into the bottom of the slot 104 after the slot 104 passes the engagement member 120. As seen in FIG. 22, the finger 172 includes an elongate body 174 extending circumferentially from wings 158 of the guide 110 and a hook 176 extending downward from a distal end of the body 174. The hook 176 is sized to extend into the slot 104 and engage the powder. During operation, the first plate 102 rotates relative to the guide 110 and the finger 172 moves through the slot 104 and directs powder downward into the slot 104. As the first plate 102 rotates, the ramps 136 lift the finger 172 out of the slot 104 so that the bridges 134 may pass the finger 172 unobstructed.

Figure 7:
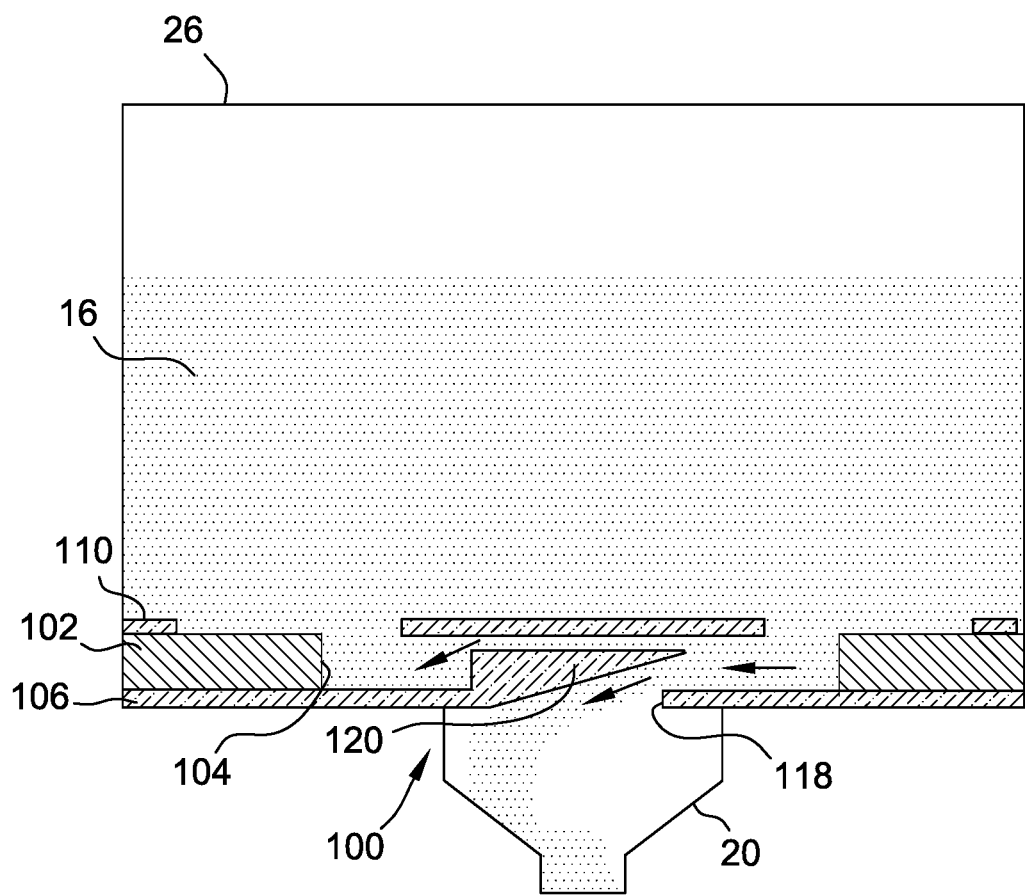
FIG. 7 is a simplified schematic diagram of a portion of the powder dispenser, illustrating flow of powder through the metering assembly.

Also, as seen in FIGS. 7 and 8, the bridges 134 are disposed within an upper portion of the slot 104 and do not obstruct the path of the engagement member 120 through the slot 104. For example, the bridges 134 do not project below a midline of the slot 104 and the portion of the slot 104 below the bridges 134 is free of any obstructions to the engagement member 120. In the illustrated embodiment, the first plate 102 includes three of the bridges 134. The first plate 102 may include more or less than three of the bridges 134 without departing from some aspects of the disclosure.

Referring to FIGS. 1 and 11-14, the second plate 106 is sized and shaped to fit within the reservoir 26. For example, the second plate 106 is a circle and has a diameter that is less than the diameter of the reservoir 26. In suitable embodiments, the second plate 106 is incorporated into the reservoir 26. For example, in some embodiments, the reservoir 26 is constructed with the second plate 106 as a bottom of the reservoir 26 and the engagement member 120 extends upwards from the bottom of the reservoir 26.

As seen in FIGS. 4 and 11-14, the second plate 106 has an upper surface 138. The upper surface 138 of the second plate 106 is flat and is configured to engage the lower surface 137 of the first plate 102 and facilitate rotation of the first plate 102 relative to the second plate 106.

The engagement member 120 extends upwards from the upper surface 138 and into the slot 104 defined by the first plate 102. The upper surface 138 facilitates the powder moving within the slot 104 and across the second plate 106 as the first plate 102 rotates. Suitably, the upper surface 138 provides a coefficient of friction that is less than the coefficient of friction between the powder and the sidewalls of the slot 104. In addition, the bridges 134 facilitate the powder rotating with the first plate 102.

Referring to FIGS. 4 and 11-14, the second plate 106 has a bore 144 sized and shaped to receive the drive shaft 126 without engaging the drive shaft 126. For example, the bore 144 has a diameter that is larger than a width of the drive shaft 126. The drive shaft 126 extends through the bore 144 and couples to the first plate 102. The bore 144 is a circle and is located at a center of the second plate 106. The opening 118 and the engagement member 120 are spaced a radial distance from the bore 144 and are aligned radially with the slot 104 when the second plate 106 is coupled to the first plate 102.

The engagement member 120 is shaped to direct a predetermined volume of the powder from the slot 104 into the opening 118 as the first plate 102 rotates. The engagement member 120 is aligned with and located proximate the opening 118 such that a portion of the engagement member 120 extends over the opening 118 and directs a predetermined volume of the powder into the opening 118.

The engagement member 120 has a first proximal end 140 that is joined to the upper surface 138 of the second plate 106 and a second distal end 142 that extends into the slot 104. In suitable embodiments, the distal end 142 is curved. The engagement member 120 is also curved circumferentially to match the curve of the slot 104. In addition, the engagement member 120 has a height that is less than the full depth of the slot 104 such that the engagement member 120 can move through the slot 104 without contacting the bridges 134.

Figure 15:
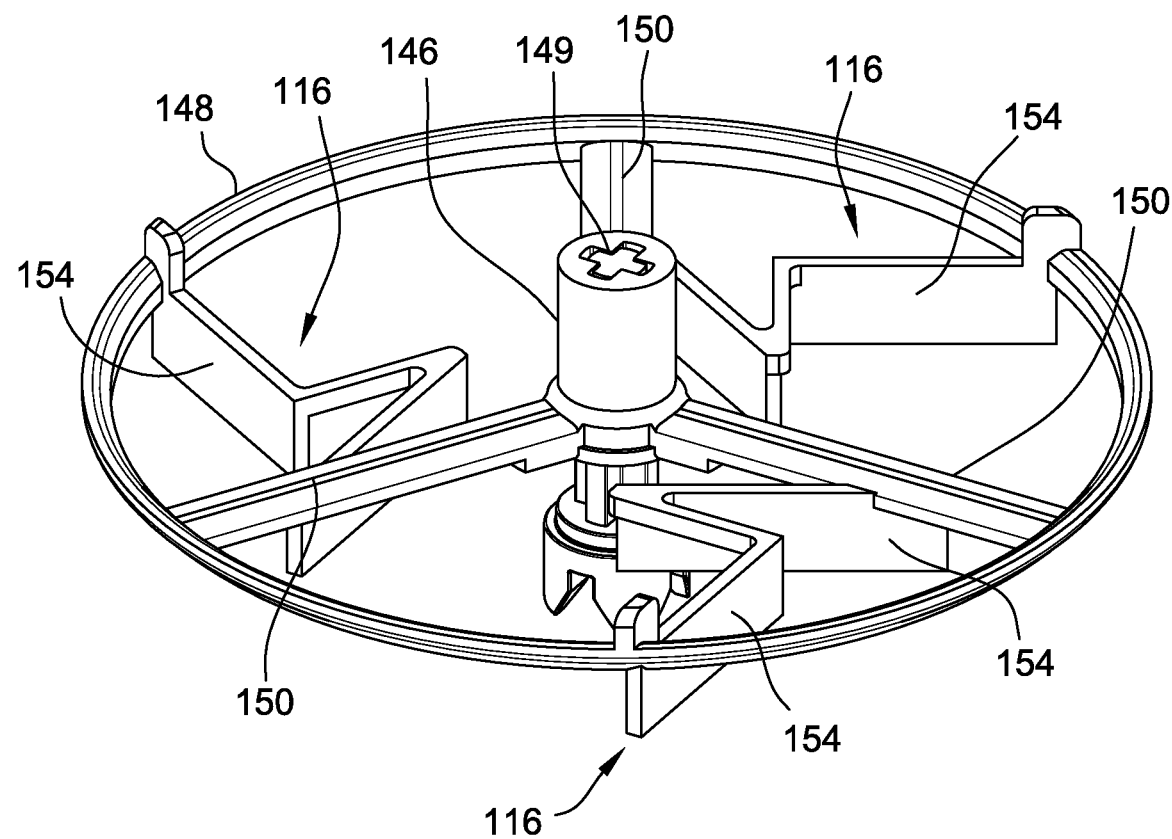
FIG. 15 is a perspective view of the rotor of the metering assembly.
Figure 16:
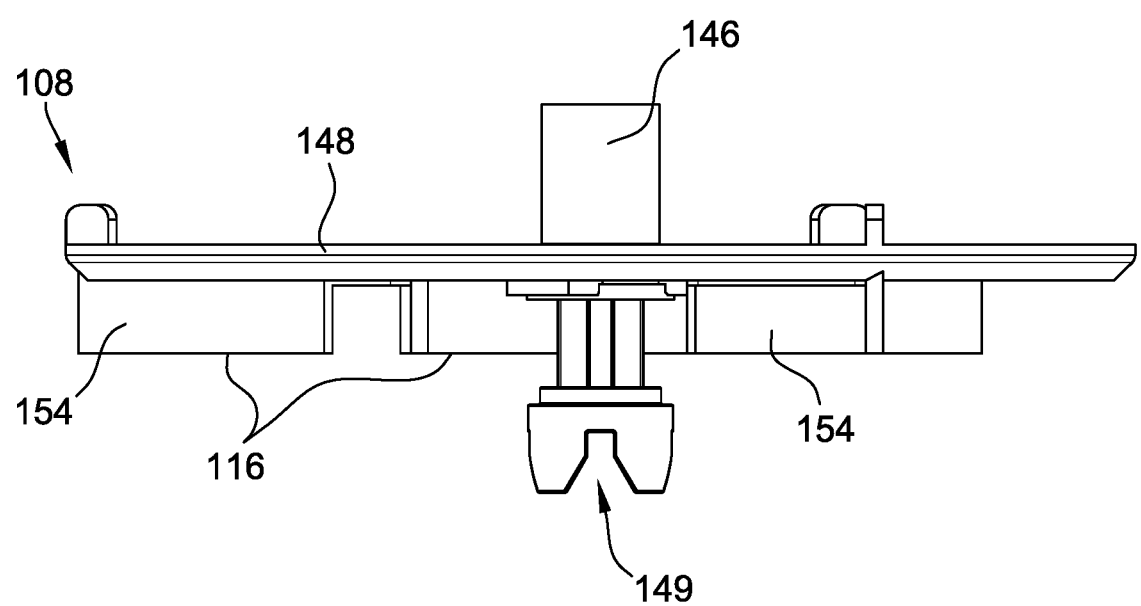
FIG. 16 is a side view of the rotor.
Figure 17:
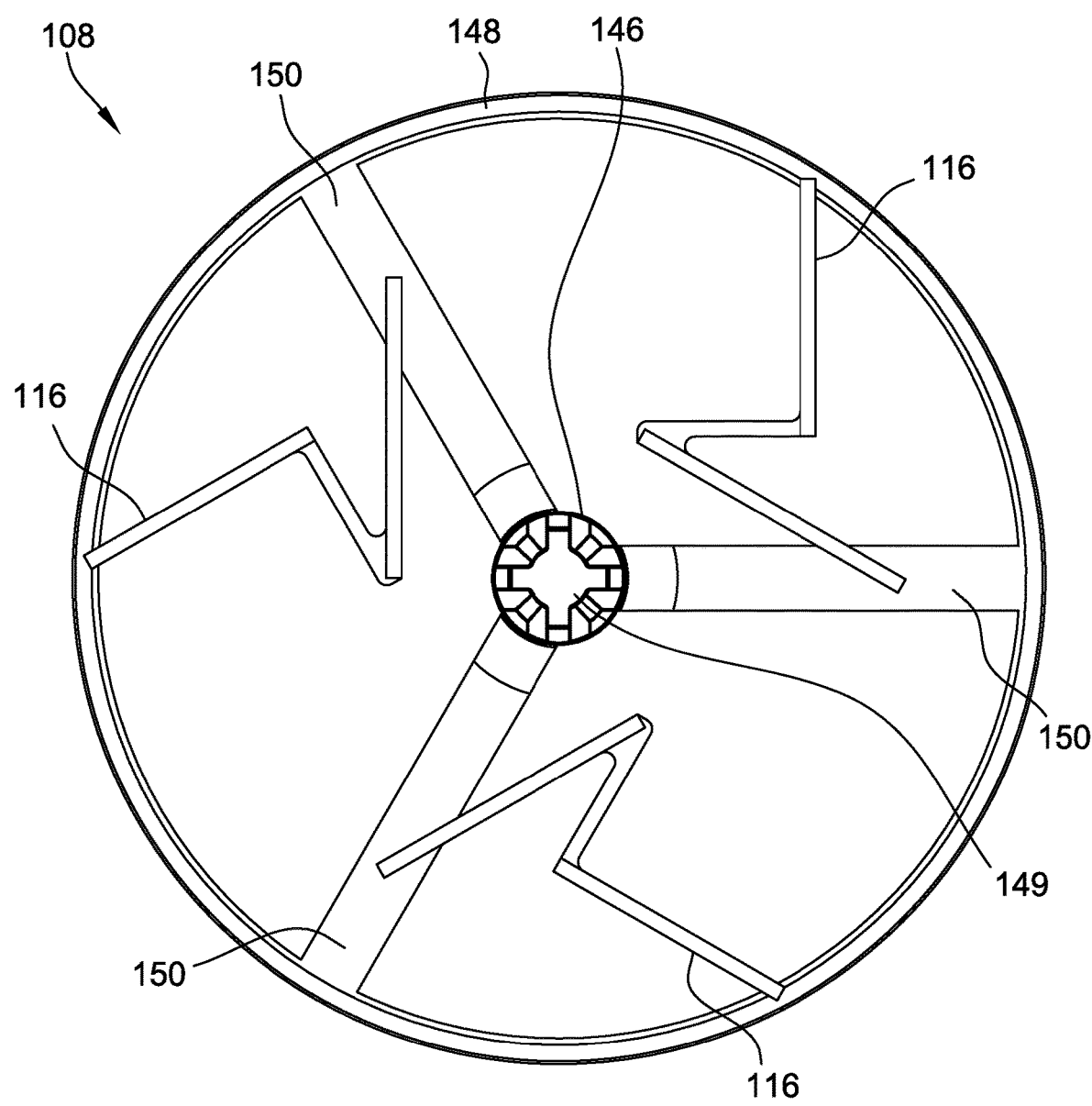
FIG. 17 is a bottom view of the rotor.

Referring to FIGS. 15-17, the rotor 108 includes a central column 146, a ring 148, supports 150, and the blades 116. The central column 146 is shaped to receive and engage the drive shaft 126 (shown in FIG. 1). The supports 150 extend radially outward from the central column 146 to the ring 148. The ring 148 is sized to fit within the reservoir 26 (shown in FIG. 1).

The blades 116 are disposed between the central column 146 and the ring 148 and are coupled to and extend downward from the supports 150 and the ring 148. The blades 116 include planar contact surfaces 154 that are arranged at angles relative to the supports 150. The blades 116 engage and mix the powder and direct the powder towards the guide 110 and the slot 104. Suitably, the rotor 108 may include two of the blades 116 on each of the supports 150. In suitable embodiments, the rotor 108 includes longer blades 116 that are arranged to provide alternate sweeps of the powder from outside-in and inside-out and to cross the entire surface of the power, as seen in FIGS. 15-17. For example, the planar contact surfaces 154 of the blades 116 extend at different, alternating angles to form zig-zag shapes.

Figure 18:
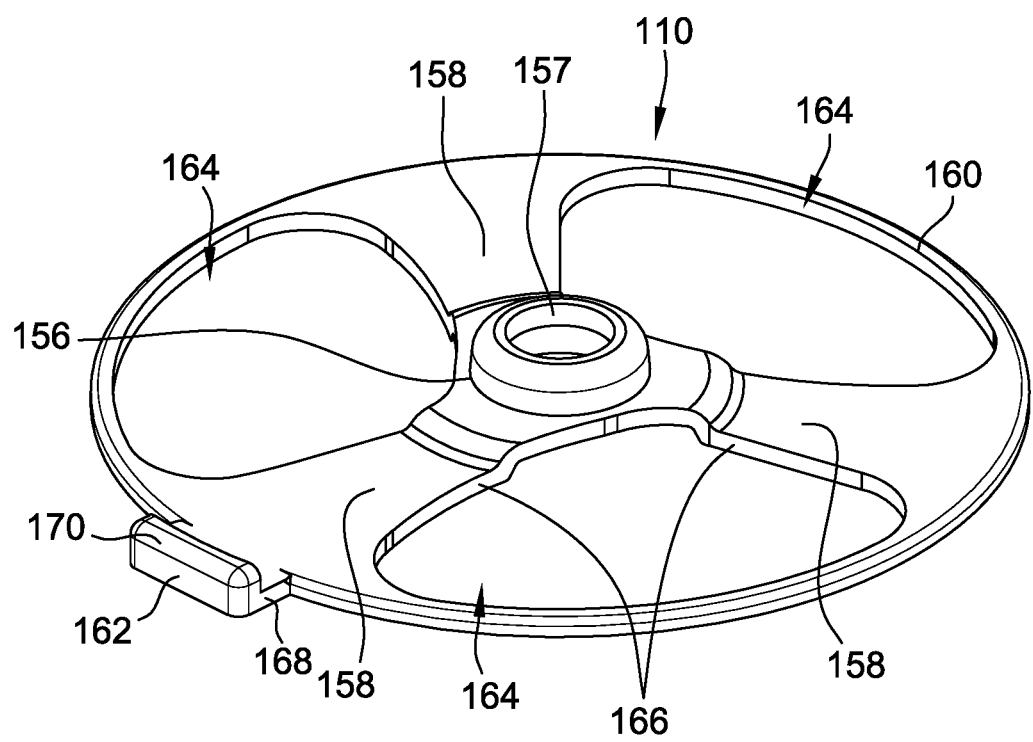
FIG. 18 is a perspective view of the guide of the metering assembly.
Figure 19:
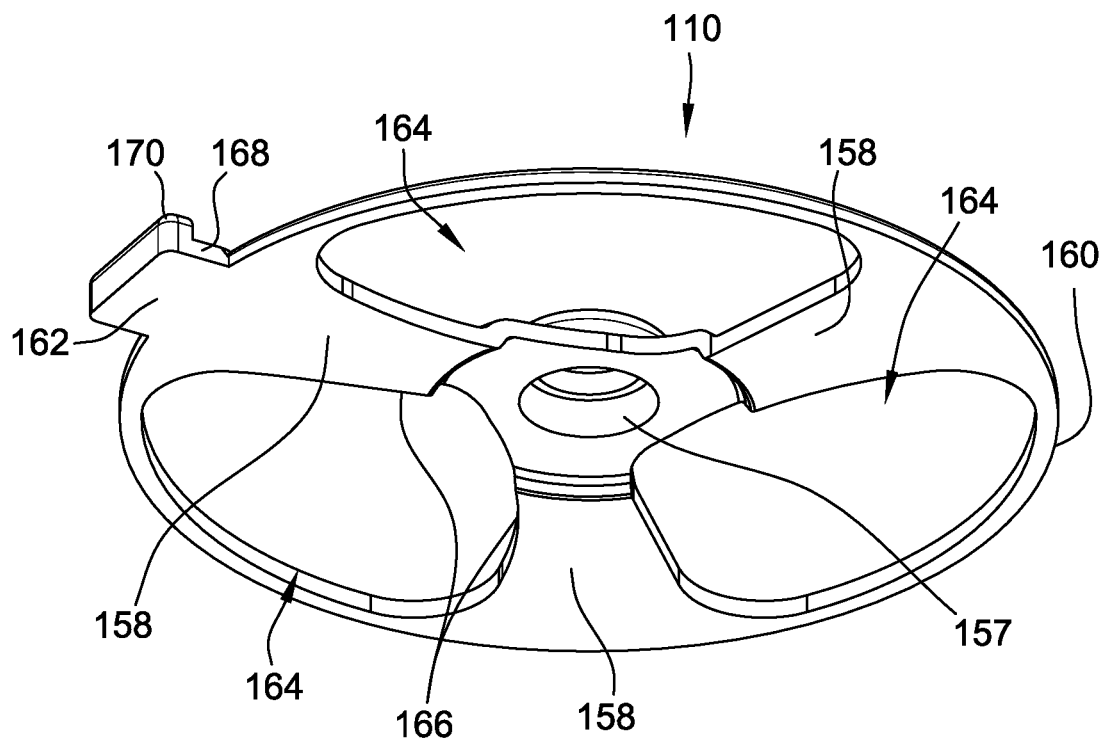
FIG. 19 is another perspective view of the guide illustrating a lower surface of the guide.

As seen in FIGS. 4 and 17, the central column 146 of the rotor 108 includes a bore 149 that is shaped to engage the drive shaft 126 and cause the rotor 108 to rotate with the drive shaft 126 when the drive shaft 126 rotates generally around the axis 114. For example, the bore 149 a cross shape which matches the shape of the drive shaft 126. The bore 149 is located at a center of the rotor 108. The bore 149 does not extend along the entire central column 146 and the top of the central column 146 is closed to prevent powder in the reservoir 26 from entering into the bore 149. The drive shaft 126 extends into the bore 149 and causes the rotor 108 to rotate and mix the powder As seen in FIGS. 18 and 19, the guide 110 includes a central member 156, wings 158, a ring 160, and a stop 162. The ring 160 is sized and shaped to fit within the reservoir 26. The stop 162 extends outward from the ring 160 and is arranged to engage the reservoir 26. For example, the stop 162 includes a first tab 168 extending radially outward from the ring 160 and a second tab 170 extending axially upward from the first tab. The stop 162 fixes the guide 110 against rotation when the rotor 108 and the first plate 102 rotate. The reservoir 26 (shown in FIG. 1) may include a notch or engagement member that is arranged to receive the stop 162.

The wings 158 extend between the central member 156 and the ring 160. Suitably, the central member 156, the ring 160, and the wings 158 define compartments 164 and are shaped to engage the powder and retain the powder above the slot 104 (shown in FIG. 4). For example, the wings 158 include curved edges 166 that form sides of the compartments 164 and stop rotation of the powder within the reservoir. During operation, the blades 116 of the rotor 108 (shown in FIGS. 15-17) travel over the wings 158 and direct powder into the compartments 164 of the guide 110 as the rotor rotates.

Referring to FIGS. 4, 18, and 19, the central member 156 defines a bore 157 that is sized and shaped to receive the drive shaft 126 without engaging the drive shaft 126. For example, the bore 157 is a circle and has a diameter that is larger than a width of the drive shaft 126. The drive shaft 126 extends through the bore 157 and engages the rotor 108. The bore 157 is located at a center of the central member 156 of the guide 110.

As seen in FIGS. 4-7, during operation, the reservoir 26 is provided with a supply of powder 16. When power is supplied to the motor assembly 112, the motor 124 induces rotation of the drive shaft 126 and the drive shaft 126 causes rotation of the first plate 102 and the rotor 108. The second plate 106 engages with or is incorporated with the bottom of the reservoir 26 and does not rotate. The guide 110 is fixed against rotation by the stop 162. In suitable embodiments, the second plate 106 and/or the guide 110 may be configured to rotate with the drive shaft 126.

The rotor 108 mixes the powder 16 and directs the powder 16 toward the guide 110. The guide 110 collects powder 16 above the slot 104 within the compartments 164. The powder 16 continuously flows into and fills the slot 104 as the first plate 102 rotates below the guide 110. The engagement member 120 extends into the slot 104 and removes a predetermined volume of powder 16 from the slot 104 as the first plate 102 rotates relative to the second plate 106. In particular, the distal end 142 of the engagement member 120 contacts powder 16 at a predetermined depth in the slot 104 and causes the powder 16 to move along the curved extension of the engagement member 120 and into the opening 118. Excess powder 16 within the slot 104 flows across the top of the engagement member 120 and beyond the engagement member. After the slot 104 rotates past the engagement member 120, the slot 104 is refilled with powder 16 that has been collected by the guide 110 above the slot.

The number of rotations (either partial or full rotations) of the first plate 102 determines the volume of the powder 16 that is dispensed by the powder dispenser 10 and can be adjusted to change the volume of dispensed powder 16. For example, the volume of powder 16 dispensed per rotation of the first plate 102 is calculated based on the size of the engagement member 120 and the volume of the slot 104. The powder dispenser 10 determines a number of rotations of the first plate 102 that are required to provide a desired volume of powder 16 based on a user input and/or a preset recipe. In suitable embodiments, the number of rotations of the first plate 102 are adjusted to vary the dispensed volume of powder 16. Accordingly, the powder dispenser 10 provides precise volumes of the powder 16 for each use.

In addition, the powder dispenser 10 is adjustable to a greater degree than other dispensers. For example, the rotation of the first plate 102 can be divided into angular measurements that provide predetermined volumes of powder 16 based on the characteristics of the powder dispenser 10. The rotation of the first plate 102 is controlled by the motor 124 based on the rotations required to provide a desired volume of powder 16. For example, the motor 124 may be a stepper motor that divides the rotation into a number of steps and relates each step to an angular rotation of the first plate 102, a volume of powder 16 that will be dispensed, and/or a flow rate of the powder 16 through the opening 118. The dispenser 10 determines the number of steps that are required to provide a desired volume of powder 16 and operates the motor 124 to provide the volume of powder 16. The rotation of the first plate 102 is controlled by each step of the motor 124 and the first plate 102 is rotated such that the engagement member 120 removes the precise volume of powder 16 from the slot 104 during the rotation. Thus, the metering assembly 100 provides graduated control of the volume of the powder 16 that is dispensed.

The powder 16 removed by the engagement member 120 from the slot 104 flows through the opening 118 and into the funnel 20. The powder 16 may be mixed with liquid within the funnel 20. The predetermined volume of powder 16 and/or a mixture is dispensed through the outlet 24 of the funnel 20 into the bottle 18. Accordingly, the powder dispenser 10 dispenses a precise volume of powder 16 or mixture into the bottle 18. The powder 16 or mixture may be mixed within the bottle 18.

After powder 16 is dispensed, the powder 16 within the reservoir 26 may need to be replenished to facilitate proper functioning of the powder dispenser 10. In suitable embodiments, the powder dispenser 10 includes one or more sensors that detects the volume of powder 16 within the reservoir, the powder 16 dispensed through the dispenser, and/or any other operating parameter of the powder dispenser 10. The powder dispenser 10 may provide an indication when the reservoir 26 needs to be replenished and/or the powder dispenser 10 may alter operation of the powder dispenser 10 based on the detected information. Suitably, the arrangement of the slot 104 facilitates proper operation of the powder dispenser 10 with a low level of the powder within the reservoir 26 because the powder is continuously directed into the slot 104 and the dispensed powder is withdrawn from the continuously replenished slot 104.

Figure 20:
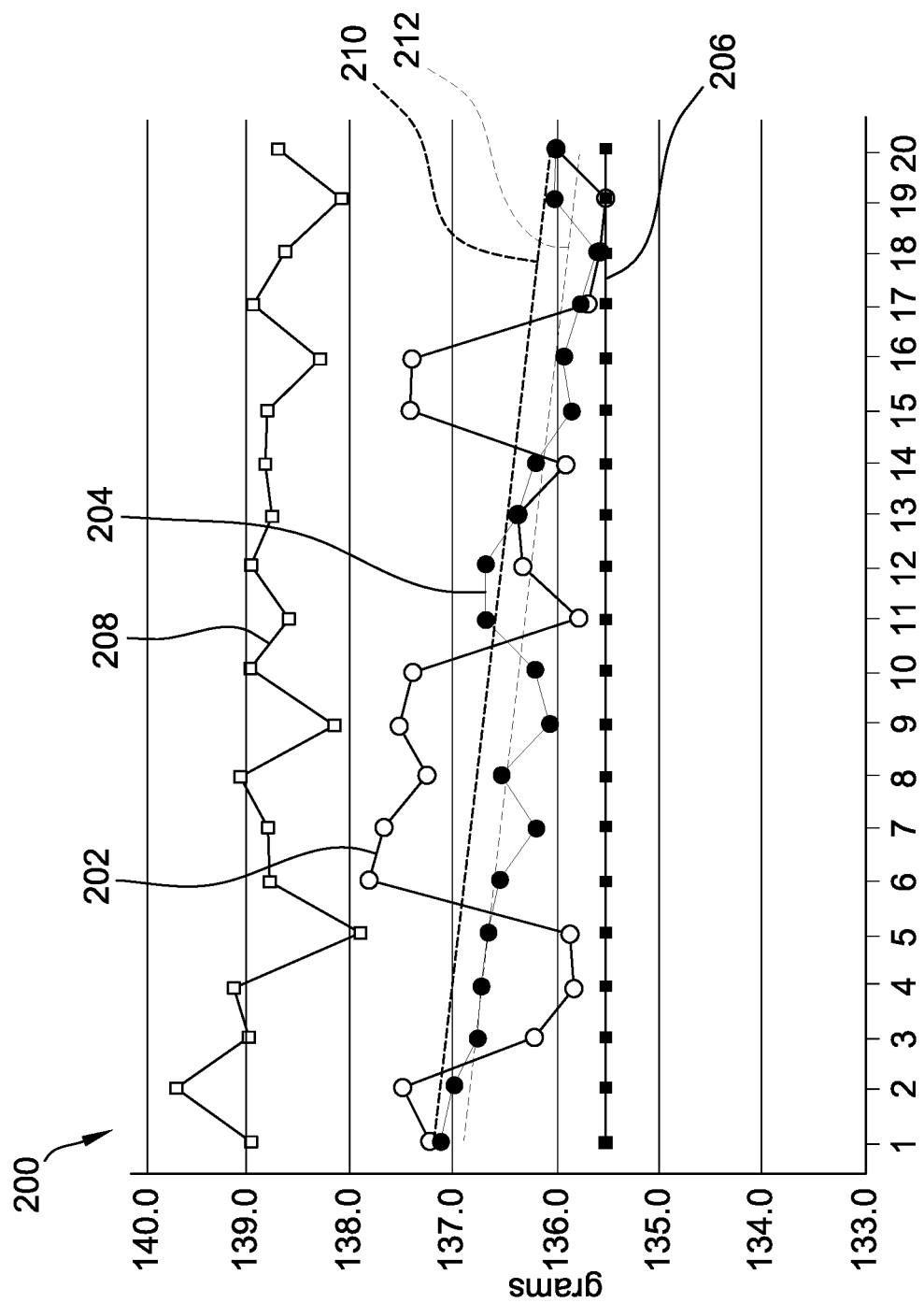
FIG. 20 is a graphical representation of the amount of powder provided by different methods of preparing infant formula.

FIG. 20 is a graphical representation of the amount of powder provided by different methods for preparing bottles of infant formula. FIG. 20 includes a graph 200 having a Y-axis that represents an amount of formula in units of grams, and an X-axis that represents the iteration number of the bottles. The amount of powder provided by the various methods or apparatus were measured for 20 bottles. Each bottle contained approximately 4 ounces of the infant formula.

In the graph 200, a curve 202 represents the powder provided by a prior art powder dispenser. A curve 204 represents the powder provided by a powder dispenser in accordance with embodiments described herein (e.g., powder dispenser 10, 310). A curve 206 represents the target amount of powder required for each bottle of infant formula. A curve 208 represents the amount of powder provided by hand measuring powder using a scoop. A curve 210 illustrates a best fit line of the curve 202 for the prior art powder dispenser. A curve 212 represents a best fit line of the curve 204 for the embodiment of the powder dispenser described herein.

As seen in FIG. 20, the curve 212 for the linear regression of the powder dispenser of the present disclosure is closer to the target amount of powder, represented by the curve 206, than the prior art dispensers and the hand measured powder represented by curves 208, 210. In addition, the curve 204 for the powder provided by the powder dispenser of the present disclosure has less variation between peaks and valleys than the prior art dispensers and the hand measured powder represented by curves 202, 208. Accordingly, the powder dispenser 10 dispenses volumes of powder in more precise and accurate amounts than other methods of preparing formula.

FIGS. 23-26 show portions of another embodiment of a powder dispenser 310 that is similar to the powder dispenser 10 described above, except that the powder dispenser 310 includes another embodiment of a second plate 306 instead of the second plate 106. Components of the powder dispenser 310 include identical numbering to similar components of the powder dispenser 10, with different components (e.g., second plate 306) including different reference numbers. For example, the first plate 102 of the powder dispenser 10 and the first plate 102 of the powder dispenser 310 are substantially similar, and therefore the first plate 102 of the powder dispenser 310 will be referenced as first plate 102.

Figure 23:
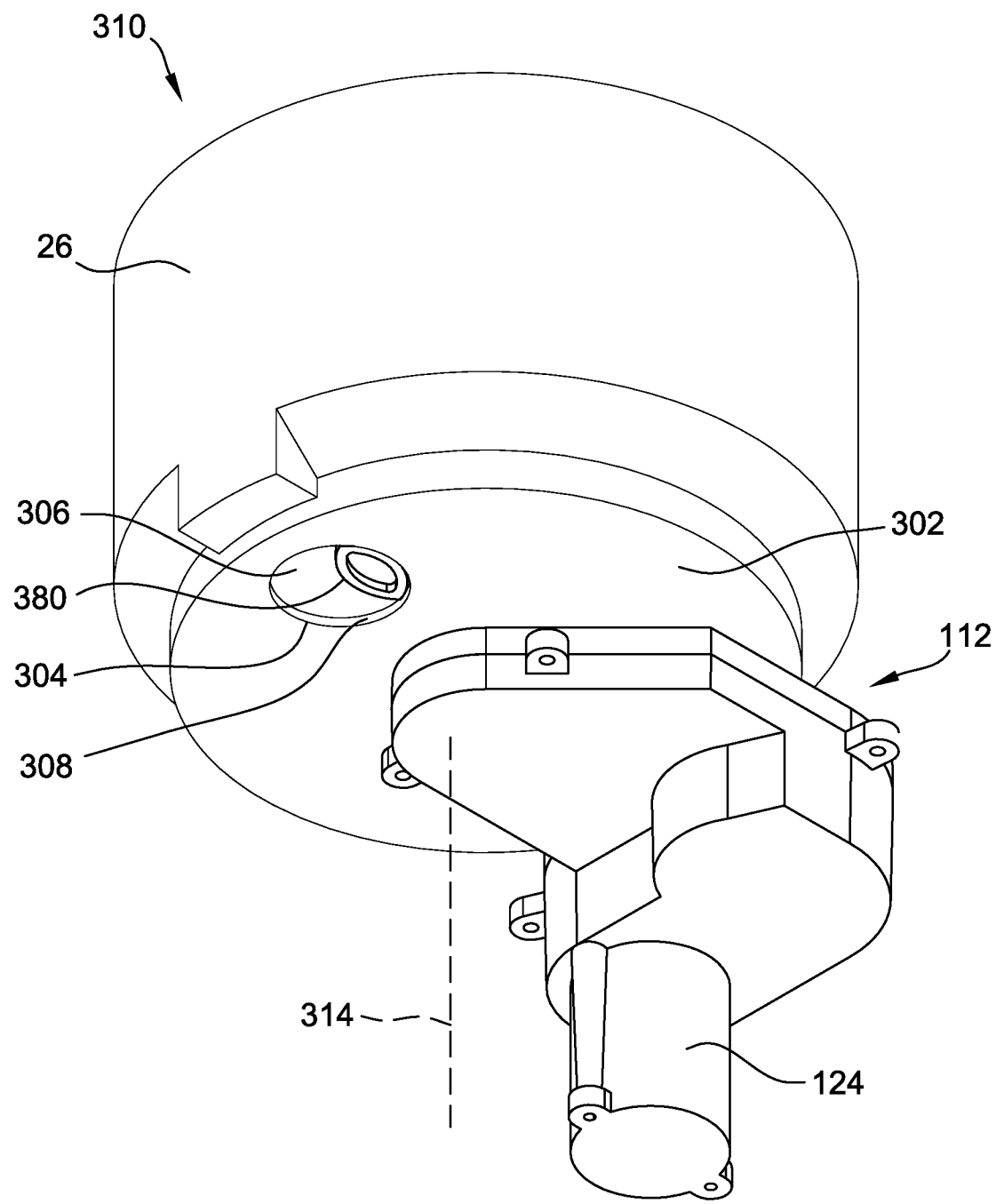
FIG. 23 is a bottom perspective view of a powder dispenser including another embodiment of the second plate, the second plate being illustrated in a first position.
Figure 24:
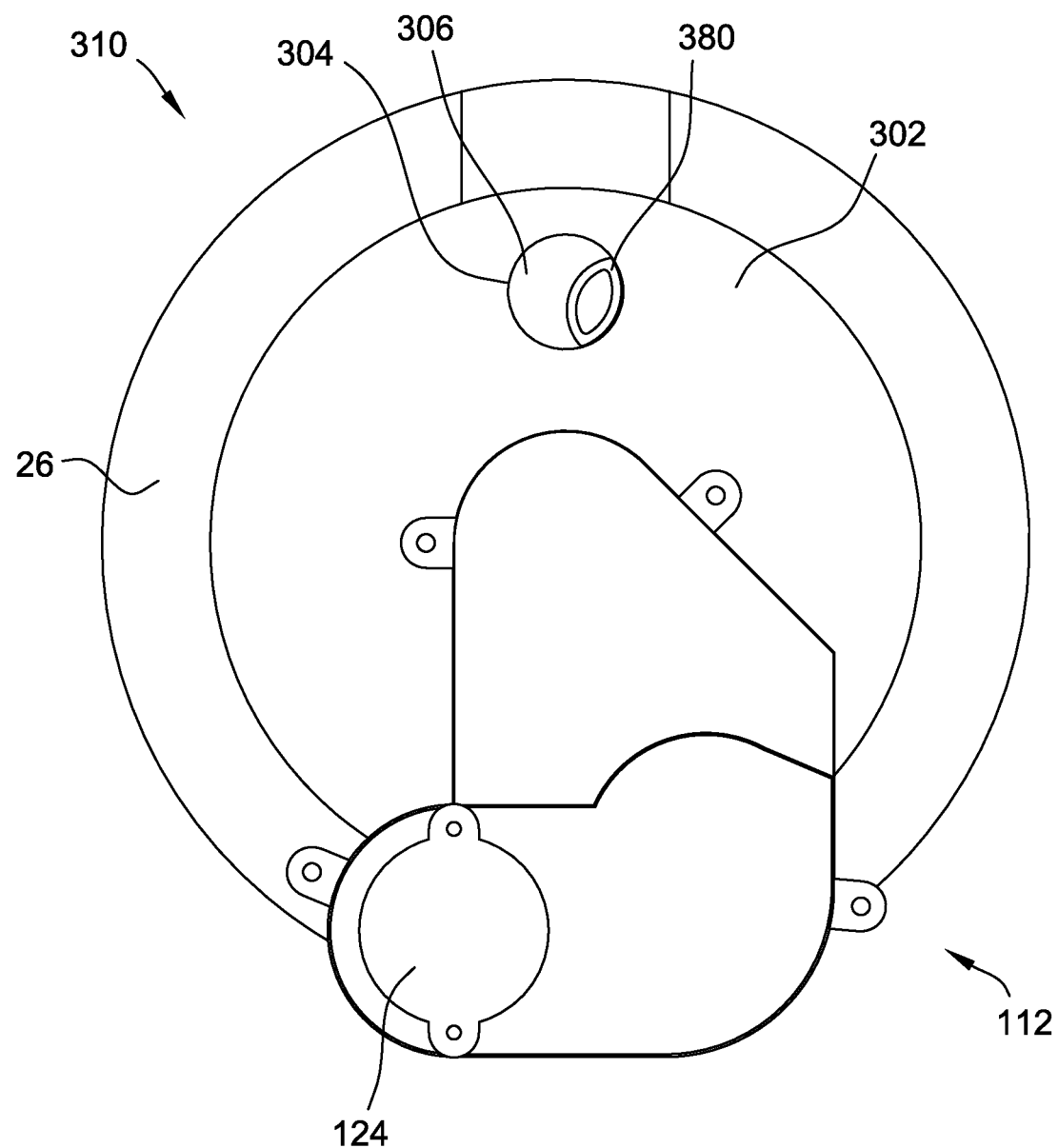
FIG. 24 is a bottom view of the powder dispenser shown in FIG. 23.
Figure 25:
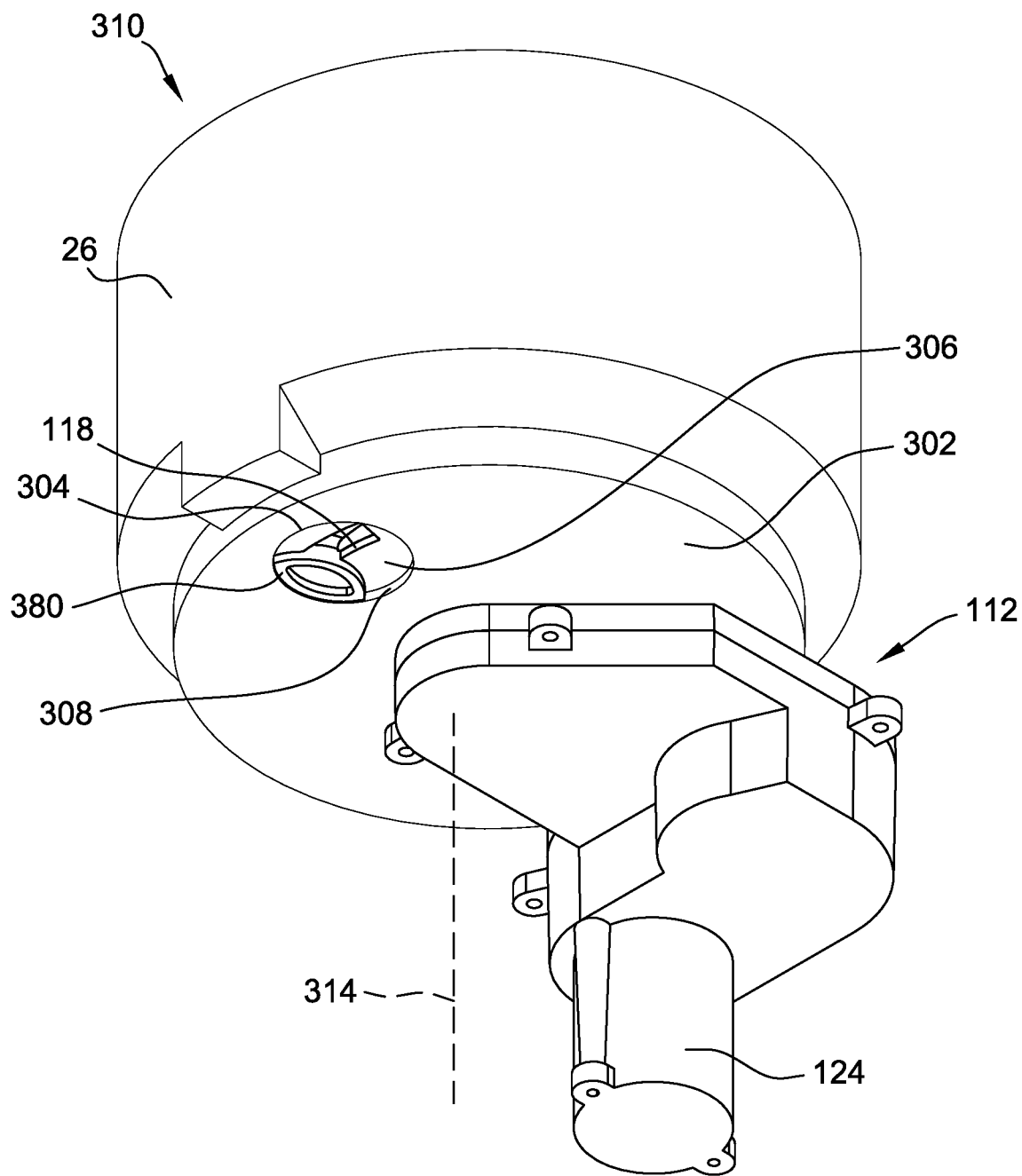
FIG. 25 is a bottom perspective view of the powder dispenser with the second plate illustrated in a second position.
Figure 26:
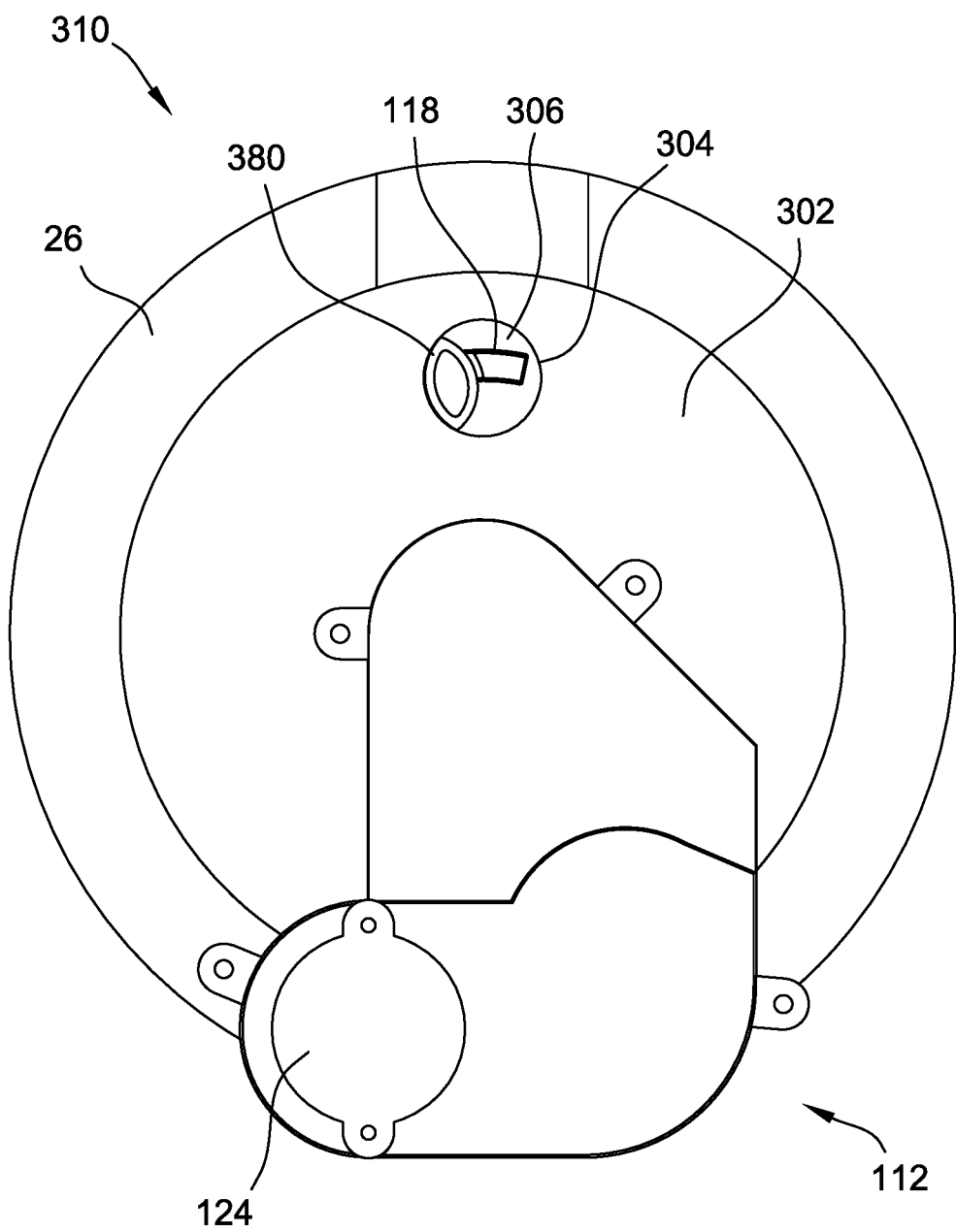
FIG. 26 is a bottom view of the powder dispenser shown in FIG. 25.

As illustrated in FIGS. 23 and 24, the reservoir 26 defines at least one opening 304. More specifically, the reservoir 26 includes a bottom surface 302, and the bottom surface 302 defines the at least one opening 304 therein that is selectively covered by at least a portion of the second plate 306. The second plate 306 in this embodiment is not fixed relative to the reservoir 26, and is instead configured to rotate generally about a central axis 314 between a first position (e.g., FIG. 23) and a second position (e.g., FIG. 25) to selectively cover the opening 304. In the first position, the second plate 306 covers the opening 304 such that powder 16 in the reservoir 26 is inhibited from being dispensed from the opening 304 and such that air and moisture are inhibited from entering the reservoir 26 and contacting the powder 16. In the second position, the second plate 306 is rotated such that the opening 304 is at least partially uncovered by the second plate 306 such that the powder 16 may be dispensed from the powder dispenser 310. The reservoir 26 may define any suitable number of openings 304 having any suitable shape that enables the powder dispenser 310 to function as described herein.

FIGS. 27-30 illustrate a bottom perspective view, a top view, a bottom view, and a side view, respectively, of the second plate 306. The second plate 306 is similar to the second plate 106 except as described herein. Components of the second plate 306 include identical numbering to similar components of the second plate 106, with different components (e.g., key 380) including different reference numbers. While the second plate 106 engages with or is incorporated with the bottom of the reservoir 26 and does not rotate relative to the reservoir 26, the second plate 306 illustrated in FIGS. 27-30 is not fixed to the reservoir 26 and rotates relative to the reservoir 26 over a limited angular measurement or displacement generally about the central axis 314, as described further herein.

The second plate 306 is sized and shaped to fit within the reservoir 26. More specifically, the illustrated second plate 306 is a disk having a diameter that is slightly less than the diameter of the reservoir 26. The second plate 306 has a flat upper surface 338 and an opposed flat lower surface 339. The upper surface 338 of the second plate 306 is configured to engage the lower surface 137 of the first plate 102 to facilitate limited rotation of the second plate 306 during movement of the first plate 102, as described further herein. The upper surface 338 also facilitates the powder within the reservoir 26 moving into the slot 104 and across the second plate 306 when the first plate 102 rotates relative to the second plate 306. Suitably, the upper surface 338 of the second plate 306 provides a coefficient of friction that is less than the coefficient of friction between the powder and the sidewalls of the slot 104.

Figure 27:
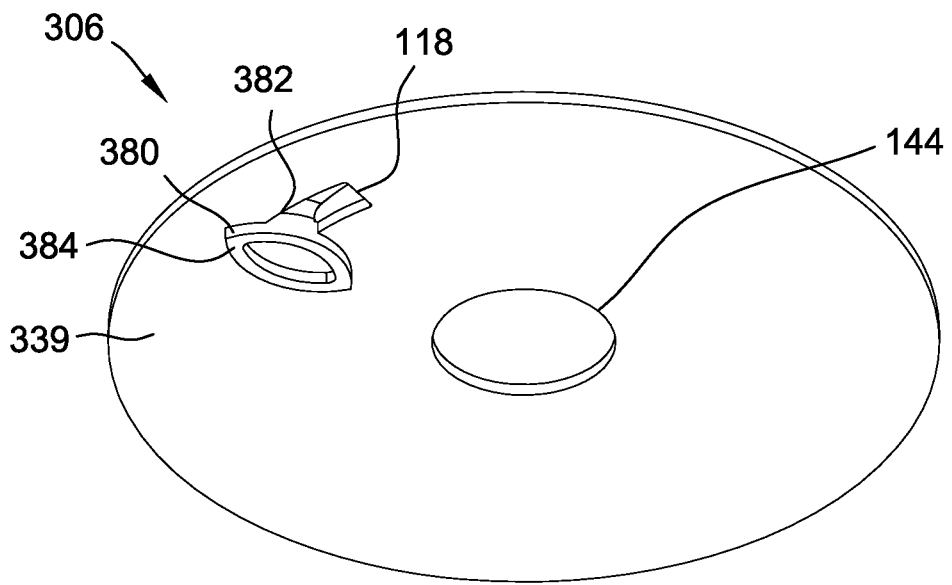
FIG. 27 is a bottom perspective view of the second plate.
Figure 28:
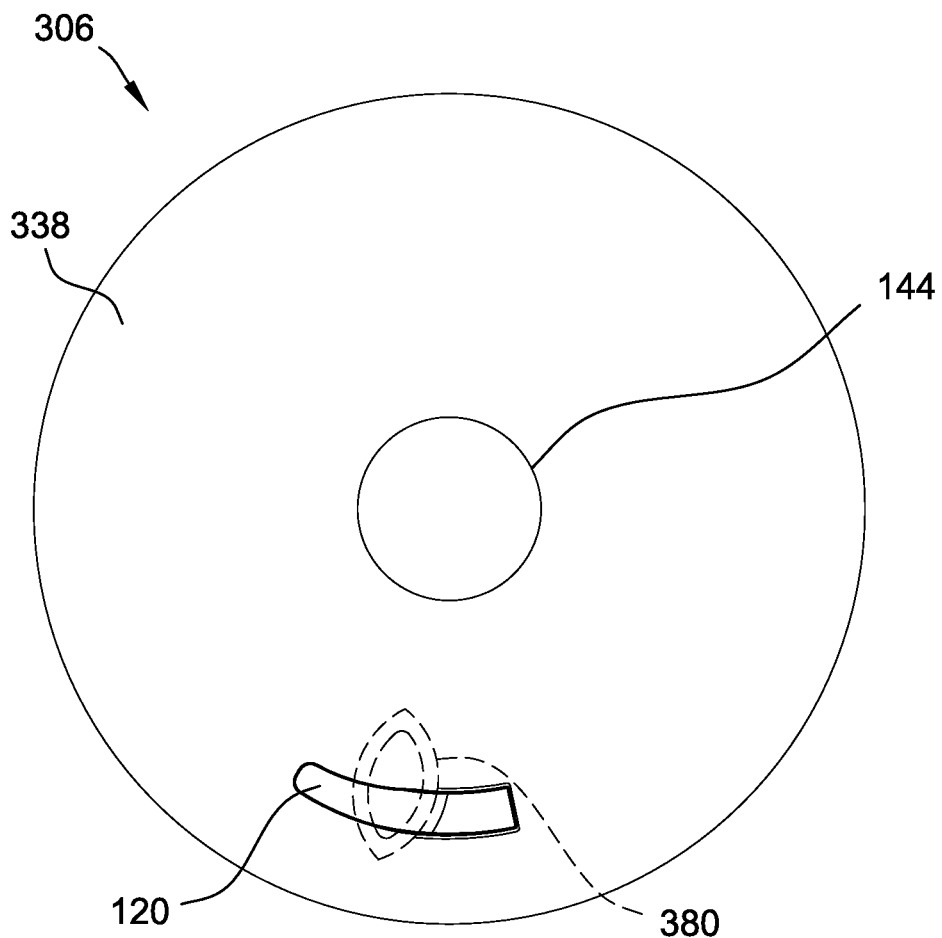
FIG. 28 is a top view of the second plate.
Figure 29:
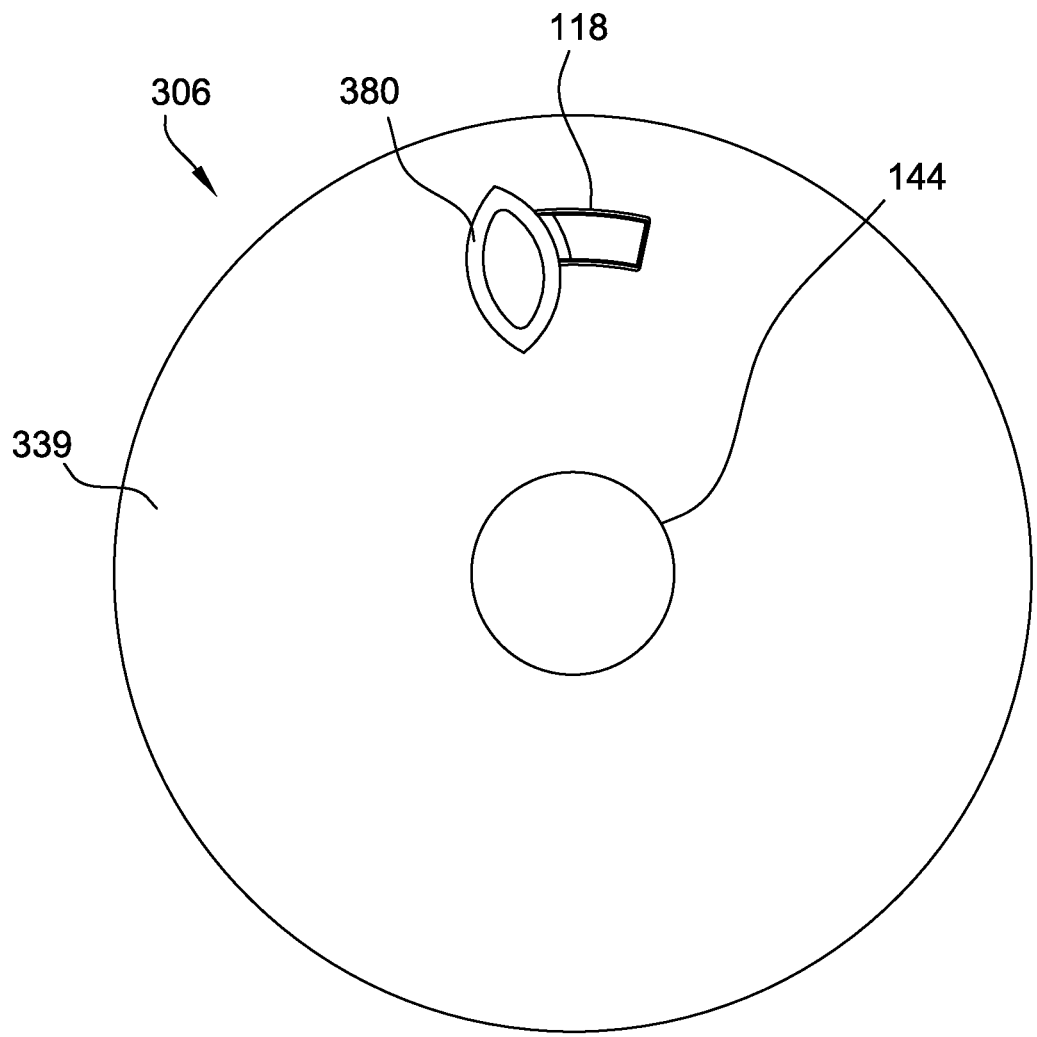
FIG. 29 is a bottom view of the second plate.
Figure 30:
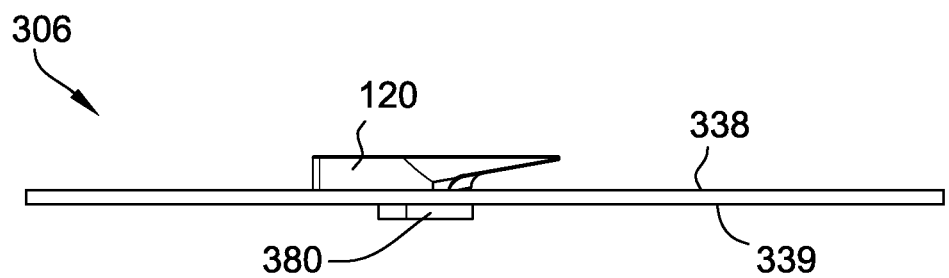
FIG. 30 is a side view of the second plate.

As seen in FIGS. 27-30, the second plate 306 includes the engagement member 120 and a key 380. With reference to FIG. 27, the key 380 extends from the second plate 306 and has a first proximal end 382 that is joined to the lower surface 339 of the second plate 306 and a second, free distal end 384. The second, free distal end 384 extends into the opening 304 of the reservoir 26 (FIG. 26) and the key 380 limits rotation of the second plate 306 relative to the reservoir 26 between the first position and the second position by engaging the reservoir 26. The key 380 engages the edge of the opening 304 of the reservoir 26 as the second plate 306 is rotated between the first and second positions. More specifically, the opening 304 is defined by a circular edge 308 and the key 380 engages portions of the circular edge 308 of the opening 304 to limit rotation of the second plate 306 relative to the reservoir 26 as the second plate 306 is rotated.

As illustrated in FIGS. 23 and 24, the key 380 engages the reservoir 26 (e.g., circular edge 308 of the opening 304 of the reservoir 26) and prevents the second plate 306 from rotating further counterclockwise relative to the reservoir 26. Rotation of the second plate 306 generally about the central axis 314 may be limited to, for example, an angular measurement or displacement between the first position and the second position of between about 1° and 180°, between about 10° and 150°, between about 20° and 120°, between about and 90°, between about 10° and 60°, between about 5° and 50°, between about 10° and between about 5° and 30°, between about 20° and 30°, and between about 20° and 25°.

In some embodiments, the key 380 may be positioned on the upper surface 338 of the second plate 306, and the key 380 may slide within one or more slots (not shown) that are cut into an inner surface (not labeled) of the reservoir 26. The one or more slots may extend around only a portion of the inner surface of the reservoir 26, and the rotation of the second plate 306 relative to the reservoir 26 may be limited by the key 380 engaging each end of the one or more slots in the inner surface of the reservoir 26.

During use, the motor assembly 112 induces rotation of second plate 306 via friction between the first plate 102, the second plate 306, and/or powder 16 positioned between the first plate 102 and the second plate 306. More specifically, the motor assembly 112 induces rotation of the first plate 102 (e.g., as described above), and friction between the first plate 102, the second plate 306, and/or powder 16 positioned between the first plate 102 and the second plate 306 causes the second plate 306 to rotate in the same direction as the first plate 102.

The friction between the first plate 102 and the second plate 306 may be generated from direct contact between the first plate 102 and the second plate 306. For example, the engagement member 120 may be wide enough such that the engagement member 120 contacts the sidewalls of the slot 104, and the friction between the engagement member 120 and the sidewalls of the slot 104 may cause the second plate 306 to rotate with the first plate 102.

In some suitable embodiments, friction between the powder 16 and the second plate 306 may induce or add in rotation of the second plate 306. For example, when powder 16 is positioned on second plate 306 such that powder 16 extends into slots 104 or otherwise contacts the first plate 102, rotation of the first plate 102 that causes movement of the powder 16 (e.g., via a direct force or friction) may cause rotation of the second plate 306 via friction between the powder 16 and the second plate 306.

The motor assembly 112 is configured to reverse the direction of rotation of the first plate 102 such that the second plate 306 can be selectively moved (e.g., rotated) between the first position (FIGS. 23 and 24) and the second position (FIGS. 25 and 26) and vice versa. For example, the motor assembly 112 may include a transmission (e.g., a gear assembly) that can selectively be engaged by the motor assembly 112 to reverse rotation of the first plate 102. In another embodiment, the motor 124 may be a bidirectional motor and may be configured to selectively rotate in a first direction or a second direction based on a control signal provided to the motor 124. For example, the user interface of the powder dispenser 310 may include a control setting that enables a user to select a rotation direction of the motor 124, the motor assembly 112, the first plate 102, the rotor 108, and/or the second plate 306. The motor assembly 112 may switch directions and/or operate without input from a user. For example, the motor assembly 112 may receive signals from a controller and/or a processor that tracks and controls the operation of the powder dispenser 310. For example, if the second plate 306 is in the second position and the powder dispenser 310 is finished dispensing powder 16, the controller and/or processor may determine that the second plate 306 needs to be rotated from the second position to the first position to close the opening 304, and the controller may send a control signal to the motor assembly 112 that results in the motor assembly 112 rotating the first plate 102 such that the second plate 306 rotates from the second position to the first position.

In operation and with the second plate 306 in the first position (e.g., with the second plate 306 covering the opening 304), the first plate 102 is rotated in a first direction (e.g., counterclockwise with respect to FIG. 24) via the motor assembly 112, which causes the second plate 306 to be rotated in the first direction with the first plate 102 until the key 380 engages the reservoir 26 (e.g., the opening 304 of the reservoir 26) and the second plate 306 is in the second position (e.g., with the opening 304 at least partially uncovered by the second plate 306), thereby aligning the at least one opening 118 in the second plate 306 with the opening 304 in the reservoir 26. When the second plate 306 rotates with the first plate 102, the relative rotation between the second plate 306 and the first plate 102 is small or nonexistent, thereby helping to prevent powder 16 from being dispensed as the second plate 306 is moved from the first position to the second position, or vice versa.

With the second plate 306 in the second position, the first plate 102 rotates relative to the second plate 306, and the powder dispenser 310 may dispense powder 16 through the opening 304 and into the funnel 20 (e.g., similar to the process for dispensing powder 16 from powder dispenser 10 that is described above). Once a suitable amount of powder 16 has been dispensed, the first plate 102 is rotated in a second, opposite direction (e.g., by reversing the direction of rotation of the motor 124, by engaging a transmission of the motor assembly 112, etc.), thereby causing the second plate 306 to rotate in the opposite direction (e.g., via friction between the first plate 102 and the second plate 306, via friction between the first plate 102, the powder 16, and the second plate 306, etc.) and towards the first position until the key 380 engages the reservoir 26 (e.g., the opening 304 of the reservoir 26). Once the key 380 engages the reservoir 26, the first plate 102 stops rotating (e.g., due to a sensor indicating that the second plate 306 is in the first position, due to a user stopping manual control of the motor assembly 112, due to a microcontroller controlling the motor 124 to rotate for a known angular displacement or a known time for the second plate 306 to reach the first position, etc.), and the opening 304 is covered by the second plate 306.

In one suitable embodiment, the powder dispenser 310 may include at least one spring (not shown) to facilitate moving the second plate 306 from the second position to the first position. For example, the at least one spring may be coupled to the second plate 306 and to another component of the powder dispenser 310 (e.g., the reservoir 26) to bias the second plate 306 toward the first position. When the first plate 102 rotates in a direction that corresponds to the second plate 306 moving from the first position to the second position, the frictional force transferred to the second plate 306 from the first plate 102 (e.g., via direct contact between the first plate 102 and the second plate 306 and/or via friction with the powder 16) may be large enough to overcome the biasing force of the at least one spring and to move the second plate 306 from the first position to the second position. When the second plate 306 reaches the second position (e.g., with the key 380 engaging the opening 304), the second plate 306 may stay in the second position while the first plate 102 keeps rotating in the same direction (e.g., due to the direct or indirect friction between the first plate 102 and the second plate 306). When rotation of the first plate is stopped (e.g., due to the desired amount of powder 16 having been dispensed), the biasing force of the spring moves the second plate 306 back towards the first position until the second plate 306 reaches the first position when the key 380 engages the reservoir 26 (e.g., the opening 304).

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A powder dispenser comprising:
   a reservoir adapted to contain a powder;
   a rotor disposed within the reservoir, wherein the rotor is configured to rotate about an axis and engage the powder within the reservoir;
   a first plate positioned below the rotor and defining a slot configured to receive the powder as the rotor rotates about the axis;
   a second plate positioned below the first plate and defining at least one opening aligned with a portion of the slot, wherein the first plate or the second plate is arranged to rotate relative to the other of the first plate or the second plate; and
   an engagement member extending upward from the second plate and into the slot defined by the first plate, the engagement member being aligned with the at least one opening on the second plate, wherein the engagement member is configured to direct a volume of the powder from the slot into the at least one opening as the first plate or the second plate rotates, and wherein the volume of the powder is dispensed through the opening as the first plate or the second plate rotates.

2. A powder dispenser in accordance with claim 1, further comprising a motor drivingly coupled to the rotor and the first plate or the second plate.

3. A powder dispenser in accordance with claim 2, wherein the motor is configured to induce the rotor and the first plate or the second plate to rotate at the same speed.

4. A powder dispenser in accordance with claim 2, wherein the motor is configured to induce the rotor and the first plate or the second plate to rotate at different speeds or in different directions.

5. A powder dispenser in accordance with claim 1, further comprising a guide disposed between the rotor and the first plate, wherein the guide is fixed in position as the rotor rotates and is arranged to direct the powder into the slot defined in the first plate.

6. A powder dispenser in accordance with claim 1, wherein the slot has a width of no more than 25 millimeters.

7. A powder dispenser in accordance with claim 1, wherein the slot extends continuously around the axis to provide a continuous unobstructed path for the engagement member as the first plate or the second plate rotates.

8. A powder dispenser in accordance with claim 7, wherein the first plate includes an inner member, an outer member, and bridges connecting the inner member to the outer member, wherein the slot extends between the inner member and the outer member and the bridges extend across the slot.

9. A powder dispenser in accordance with claim 1, wherein the rotor includes blades that are shaped to engage and direct the powder as the rotor rotates within the reservoir.

10. A powder dispenser in accordance with claim 1, wherein the second plate is a circle.

11. A powder dispenser in accordance with claim 1, further comprising a mixing compartment adapted to receive the volume of the powder dispensed through the opening and a liquid outlet configured to dispense liquid into the mixing compartment to mix with the volume of the powder.

12. A powder dispenser in accordance with claim 11, wherein the mixing compartment comprises a funnel having an outlet, wherein the funnel is configured to dispense the powder and the liquid through the outlet into a bottle positioned below the funnel.

13. A metering assembly for a powder dispenser, the metering assembly comprising:
a first plate sized to fit within a reservoir, the first plate having a slot extending around an axis, wherein the first plate is configured to rotate about the axis and receive powder within the slot;
a second plate positioned below the first plate, the second plate defining at least one opening aligned with a portion of the slot; and
an engagement member extending upward from the second plate and into the slot defined by the first plate, the engagement member being aligned with the opening on the second plate, wherein the engagement member is configured to direct a volume of the powder from the slot into the at least one opening as the first plate rotates, wherein the slot extends continuously around the axis to provide a continuous unobstructed path for the engagement member as the first plate rotates, and wherein the volume of the powder is dispensed through the opening as the first plate rotates.

14. A metering assembly in accordance with claim 13, further comprising:
a rotor disposed within the reservoir and above the first plate, wherein the rotor is configured to rotate about the axis and engage the powder within the reservoir; and
a guide disposed between the rotor and the first plate, wherein the guide is fixed in position as the rotor rotates and is arranged to direct the powder into the slot defined in the first plate.

15. A metering assembly in accordance with claim 13, wherein the slot has a width of no more than 25 millimeters.

16. A metering assembly in accordance with claim 13, wherein the first plate includes an inner member, an outer member, and bridges connecting the inner member to the outer member, wherein the slot extends between the inner member and the outer member, and wherein the bridges extend across the slot.

17. A metering assembly in accordance with claim 13, wherein the second plate is a circle.

* * * * *